(12) United States Patent
Goldish et al.

(10) Patent No.: US 10,744,362 B2
(45) Date of Patent: Aug. 18, 2020

(54) EXERCISE MACHINE

(71) Applicant: UNITED STATES GOVERNMENT AS REPRESENTED BY THE DEPARTMENT OF VETERANS AFFAIRS, Washington, DC (US)

(72) Inventors: Gary Goldish, Minneapolis, MN (US); Andrew Hansen, Minneapolis, MN (US); Eric Nickel, Minneapolis, MN (US); John Ferguson, Minneapolis, MN (US); Stuart Fairhurst, Minneapolis, MN (US)

(73) Assignees: United States Government as represented by the Department of Veterans Affairs, Washington, DC (US); Regents of the University of Minnesota, Minneapolis, MN (US)

( * ) Notice: Subject to any disclaimer, the term of this patent is extended or adjusted under 35 U.S.C. 154(b) by 157 days.

(21) Appl. No.: 16/024,470

(22) Filed: Jun. 29, 2018

(65) Prior Publication Data
US 2018/0304113 A1    Oct. 25, 2018

Related U.S. Application Data

(63) Continuation-in-part of application No. 14/640,428, filed on Mar. 6, 2015, now Pat. No. 10,018,298.
(Continued)

(51) Int. Cl.
*A63B 21/00* (2006.01)
*A63B 22/06* (2006.01)
(Continued)

(52) U.S. Cl.
CPC ..... *A63B 21/00072* (2013.01); *A61H 1/0214* (2013.01); *A61H 1/0274* (2013.01);
(Continued)

(58) Field of Classification Search
CPC ........ A63B 21/1672; A63B 2208/0242; A63B 2208/0252; A61H 2201/1261; A61H 1/0214
See application file for complete search history.

(56) References Cited

U.S. PATENT DOCUMENTS

| | | | | |
|---|---|---|---|---|
| 3,128,094 A | * | 4/1964 | Wolf | A63B 21/068 |
| | | | | 482/113 |
| 3,203,009 A | * | 8/1965 | Lundberg | A61G 7/1051 |
| | | | | 5/87.1 |

(Continued)

FOREIGN PATENT DOCUMENTS

| | | | |
|---|---|---|---|
| DE | 2121877 A1 | * 12/1972 | ......... A63B 22/0005 |
| EP | 2181687 B1 | * 10/2011 | ........... A61H 1/0292 |
| WO | WO-2014125513 A1 | * 8/2014 | ......... A63B 21/0555 |

OTHER PUBLICATIONS

DE2121877A1 Machine Translation (Year: 1971).*
(Continued)

*Primary Examiner* — Nyca T Nguyen
(74) *Attorney, Agent, or Firm* — Ballard Spahr LLP

(57) ABSTRACT

An exercise machine has a mobile base and an upright support extending upwards from the mobile base. An upper support assembly extends forward from an upper portion of the upright support and an exercise device is suspended from the upper support assembly at a location spaced forward from the upright support. The exercise machine may include a compact and safe counterbalancing gas spring mechanism that tends to move the exercise device away from the exerciser, and that requires a force to be applied to move an exercise device down towards the exerciser. The exercise machine may include an exercise device that is rotatable along a vertical axis, and may be coupled to an adjustable monitor for a wide range of uses. The exercise machine may be used by a exerciser lying supine, sitting in a chair or wheelchair, or standing in front of or adjacent the exercise machine.

20 Claims, 21 Drawing Sheets

Related U.S. Application Data

(60) Provisional application No. 62/651,001, filed on Mar. 30, 2018.

(51) Int. Cl.

| | | |
|---|---|---|
| A63B 23/12 | (2006.01) | |
| A61H 1/02 | (2006.01) | |
| A63B 22/00 | (2006.01) | |
| A63B 21/16 | (2006.01) | |
| A63B 71/02 | (2006.01) | |
| A63B 21/008 | (2006.01) | |
| A63B 21/22 | (2006.01) | |
| A61H 3/00 | (2006.01) | |
| A63B 23/02 | (2006.01) | |
| A63B 71/06 | (2006.01) | |
| B60B 33/00 | (2006.01) | |
| A63B 71/00 | (2006.01) | |
| B60T 1/14 | (2006.01) | |
| B60T 1/04 | (2006.01) | |
| A63B 21/005 | (2006.01) | |
| A63B 21/055 | (2006.01) | |
| A63B 21/062 | (2006.01) | |

(52) U.S. Cl.
CPC .......... *A63B 21/16* (2013.01); *A63B 21/1672* (2015.10); *A63B 22/0005* (2015.10); *A63B 22/0046* (2013.01); *A63B 22/0605* (2013.01); *A63B 22/0694* (2013.01); *A63B 23/02* (2013.01); *A63B 23/1209* (2013.01); *A63B 23/1281* (2013.01); *A63B 71/0054* (2013.01); *A63B 71/023* (2013.01); *A63B 71/0619* (2013.01); *A63B 71/0622* (2013.01); *B60B 33/0089* (2013.01); *B60B 33/0092* (2013.01); *B60T 1/04* (2013.01); *B60T 1/14* (2013.01); *A61H 3/008* (2013.01); *A61H 2201/0142* (2013.01); *A61H 2201/0157* (2013.01); *A61H 2201/1215* (2013.01); *A61H 2201/1635* (2013.01); *A61H 2203/0406* (2013.01); *A61H 2203/0456* (2013.01); *A63B 21/005* (2013.01); *A63B 21/0058* (2013.01); *A63B 21/0083* (2013.01); *A63B 21/0087* (2013.01); *A63B 21/0552* (2013.01); *A63B 21/0628* (2015.10); *A63B 21/225* (2013.01); *A63B 22/0007* (2013.01); *A63B 22/0076* (2013.01); *A63B 71/0009* (2013.01); *A63B 71/0036* (2013.01); *A63B 2022/0084* (2013.01); *A63B 2022/0647* (2013.01); *A63B 2071/025* (2013.01); *A63B 2071/0658* (2013.01); *A63B 2208/0204* (2013.01); *A63B 2208/0233* (2013.01); *A63B 2208/0252* (2013.01); *A63B 2210/04* (2013.01); *A63B 2225/09* (2013.01); *A63B 2225/093* (2013.01); *B60B 33/0081* (2013.01)

(56) References Cited

U.S. PATENT DOCUMENTS

| | | | | |
|---|---|---|---|---|
| 3,693,614 | A | | 9/1972 | Schon |
| 3,694,829 | A | | 10/1972 | Bakker |
| 3,848,870 | A | | 11/1974 | Craig |
| 4,478,412 | A | * | 10/1984 | Muir .................. A63B 21/0083 137/614.17 |
| 4,645,205 | A | * | 2/1987 | Wolff ................. A63B 21/4029 482/113 |
| 4,976,426 | A | | 12/1990 | Szabo |
| 5,005,829 | A | | 4/1991 | Caruso |
| 5,362,297 | A | * | 11/1994 | Muir .................... A63B 21/023 482/112 |
| 5,365,621 | A | * | 11/1994 | Blain ................... A61G 7/1017 5/83.1 |
| 5,790,995 | A | * | 8/1998 | Caden .................. A61G 7/1005 4/491 |
| 6,036,623 | A | * | 3/2000 | Mitchell .......... A63B 23/03575 482/57 |
| 6,152,855 | A | * | 11/2000 | Dean, Jr. .............. A61H 1/0259 482/114 |
| 6,289,534 | B1 | * | 9/2001 | Hakamiun ........... A61G 7/1017 5/83.1 |
| 6,457,700 | B1 | | 10/2002 | Hong |
| 6,592,502 | B1 | * | 7/2003 | Phillips ................ A61H 1/0214 482/121 |
| 6,840,892 | B1 | * | 1/2005 | Wu .................. A63B 21/00181 482/51 |
| 7,004,454 | B2 | | 2/2006 | Petrone |
| 7,225,482 | B2 | * | 6/2007 | Brooks ................ A61G 7/1011 5/83.1 |
| 7,306,548 | B2 | * | 12/2007 | Martin ............. A63B 21/00065 297/5 |
| 7,310,833 | B2 | * | 12/2007 | Maguire .............. A61G 7/1005 4/496 |
| 7,354,382 | B1 | * | 4/2008 | Warren, II .......... A61G 7/1017 482/68 |
| 7,494,450 | B2 | * | 2/2009 | Solomon .............. A61H 1/0229 482/51 |
| 8,656,529 | B2 | * | 2/2014 | Corriveau ........... A61G 7/1017 5/83.1 |
| 9,044,630 | B1 | * | 6/2015 | Lampert ............... A63B 23/035 |
| 9,643,041 | B2 | * | 5/2017 | Neill ............... A63B 21/0125 |
| 10,426,996 | B1 | * | 10/2019 | Brumit ................ A61H 1/0214 |
| 2002/0157617 | A1 | * | 10/2002 | Reinkensmeyer ... A01K 15/027 119/728 |
| 2004/0259693 | A1 | * | 12/2004 | Chien .................. A61H 1/0214 482/62 |
| 2005/0119095 | A1 | * | 6/2005 | Kramer .................... A61H 1/02 482/130 |
| 2006/0128537 | A1 | * | 6/2006 | Philips ................ A61H 1/0237 482/95 |
| 2006/0252606 | A1 | * | 11/2006 | Korb ...................... A63B 69/12 482/55 |
| 2008/0085819 | A1 | * | 4/2008 | Yang .................... A63B 21/015 482/62 |
| 2010/0113233 | A1 | | 5/2010 | Chen |
| 2012/0000496 | A1 | | 1/2012 | Razon |
| 2012/0046578 | A1 | * | 2/2012 | Agrawal ............... A61H 1/024 601/35 |
| 2013/0318708 | A1 | | 12/2013 | Wang |
| 2014/0213414 | A1 | * | 7/2014 | Balandis ............ A63B 24/0087 482/5 |
| 2015/0099614 | A1 | * | 4/2015 | Tekulve ............. A63B 69/0064 482/139 |
| 2015/0165256 | A1 | | 6/2015 | Salamon |
| 2015/0375033 | A1 | * | 12/2015 | Lanfranco ............... A63B 21/00 482/94 |
| 2016/0016036 | A1 | * | 1/2016 | Barriskill ............. A61H 1/0214 482/5 |
| 2016/0206915 | A1 | * | 7/2016 | Velert .................. A63B 22/001 |
| 2016/0258573 | A1 | * | 9/2016 | Goldish ................ F16M 11/42 |

OTHER PUBLICATIONS

EP21816878 Machine Translation (Year: 2011).*
Bamman, et al. "Impact of resistance exercise during bed rest on skeletal muscle sarcopenia and myosin isoform distribution", J Appl Physiol (1985), 84(1):157-63.
Fernando, et al. "Resistance exercise maintains skeletal muscle protein synthesis during bed rest", J Appl Physiol (1985), 82 (3), 807-10.
Figoni, "Exercise responses and quadriplegia", Med Sci Sports Exerc, 25 (4), 433-41.
Hooker, et al. "Influence of posture on arm exercise tolerance and physiologic responses in persons with spinal cord injured paraplegia", Eur J Appl Physiol (1993) 67:563-566.
Lode, "Angio Rehab with Electrical Adjustable Wall Fixation" [Retrieved Mar. 24, 2020](2 pages).

(56) References Cited

OTHER PUBLICATIONS

Nickel, et al. "Upper Limb Cycle Ergometer for Supine Exercise", J. Med. Devices. (2013), 7(2):020910 (2 pages).
Nickel, et al. Upper Limb Cycle Ergometer for Supine Exercise Poster, 2013 (1 page).
Rodby, "Ergometer Bicycle" (https://www.rodby.com/en/products/ergometer-bicycle/) [Retrieved Mar. 24, 2020](7 pages).
Shteingardt, et al., "Hand Ergometer for bedridden Patients", Tomsk Polytechnic Institute. Tomsk Medical Institute. Translated from Meditsinskaya Tekhnika, No. 5, pp. 41-42, Sep.-Oct. 1974.

* cited by examiner

EXERCISE MACHINE

CROSS-REFERENCE TO RELATED APPLICATION

This application is a continuation in part of U.S. patent application Ser. No. 14/640,428 filed on Mar. 6, 2015, and claims priority to U.S. Provisional Application No. 62/651,001 filed on Mar. 30, 2018. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The present invention relates generally to exercise machines or apparatus and methods suitable for use by exercises, for example, persons who are in a supine position in bed (e.g., patients on bed rest), others who prefer exercising in this position for safety, more comfort, pain relief or the like, as well as by users in seated or standing positions.

BACKGROUND

Exercise is widely accepted as an important element in maintaining health and wellness. Many exercise machines exist to provide users with a variety of movements, such as treadmills, stationary cycles, arm ergometers, weight lifting machines, and the like. Most exercise machines are used in ways that create complex movements and loading to the machines. For this reason, exercise machines are typically mounted on stable structural bases that stand on the floor and are immobile. In addition, most exercise machines are designed for exercise in a standing or seated position and generally remain in a room or gym that a user must go to for exercise.

Prolonged bed rest and immobilization are used in the medical treatment of several conditions in an effort to allow an exerciser's body to heal from injury or surgery, for example spinal cord injury. However, prolonged bed rest can lead to significant loss of muscle strength, and can negatively affect health in other ways as well as lengthening recovery time after healing. The cardiovascular and respiratory systems are also affected by long periods of bed rest. Exercise is therefore an important activity to alleviate the long term negative health effects of prolonged bed rest. However, most exercise machines are not suitable for use by a person in a supine position.

As an example, many arm ergometers (also known as UBE or upper body ergometers) are currently available on the market, but none are able to be used by a person lying in a supine position in a hospital bed. A previous study described a hand ergometer for bedridden patients (Shteingardt, et al, Meditsinskaya Tekhnika, No. 5, pp. 41-42, 1974) which had a mounting fixture for the foot end of a bed. The patient performs a rowing motion to lift a weight on the fixture, while lying supine in bed. Such an exercise is not appropriate for patients with spinal cord injury or other patients bedridden for extended periods of time, due to shear on the tissues of the back, buttocks and legs, placing patients at greater risk of developing pressure ulcers. The mounting fixture would also be difficult to mount on different types of hospital beds due to variation in hospital bed sizes and foot end structures, and demounting and remounting was required to move the device from patient to patient.

There are some commercially available devices which allow exercise in a supine position, specifically the Angio made by Lode BV of Groningen, Netherlands, and the RE 990S made by Rodby Innovation AB of Vange, Sweden. Both of these devices are only designed for lower limb pedaling exercise when a user is in a supine position, and are not designed for upper limb exercise while supine in a hospital bed.

Prior exercise machines for use when lying supine in a bed have disadvantages such as instability during exercise because of the mounting or support arrangement, and difficulty in moving the machines from one bed to another.

SUMMARY

In order to allow upper limb exercise by an exerciser while lying supine, an exercise machine is provided which comprises a mobile base having a forward end and a rear end, an upright support extending upwards from the mobile base, an upper support assembly extending forward from an upper portion of the upright support, and an exercise device suspended from the upper support assembly at a location spaced forward from the upright support, the mobile base being configured for positioning to extend partially under a bed with the upright support located on one side of the bed and the exercise device suspended over the bed in a position accessible by an exercise in the bed to perform exercise. In one aspect, the mobile base has a plurality of caster wheels and an anchoring system configured to prevent or resist movement of the mobile base during performance of exercise.

In one aspect, the anchoring system is configured to raise some or all of the wheels off the floor to provide a stable base during performance of exercise. In one aspect, the anchoring system comprises plurality of expandable feet on the mobile base which are movable between a raised, inoperative position and a lowered, ground-engaging or operative position in which the caster wheels are raised from the ground. In an alternative aspect, the anchoring system comprises remotely activated wheel locks associated with the caster wheels, providing mobility to the base when unlocked and providing stability to the base when locked, without the need to lift the caster wheels from the ground. Both alternatives provide a stable base during performance of exercise. In one aspect, the expandable feet or remotely lockable casters may be actuated to move back and forth between the inoperative and operative positions by a foot pedal, hand lever or other manually operable device.

The exercise device may be an active or passive exercise device and may be configured for performance of arm or leg exercises, and may be an aerobic exercise device or a weight lifting/strength exercise device. The exercise device may be an arm ergometer, rowing exerciser, press-up exercise device, pull down exercise device, bicep curl, chest press, shoulder press, pec fly, leg extension, leg press, leg ergometer, or the like.

According to another aspect, the upper support assembly comprises a four bar pivot linkage between an upper portion of the upright support and a support for the exercise device, to allow the height of the exercise device above the bed to be adjusted. A suitable actuator or drive such as a gas spring controls rotation of the four bar pivot linkage about the respective pivot axes for height adjustment. According to another aspect, a counterbalance device or counterweight is associated with the four bar pivot linkage to move the exercise device away from the exerciser as a fail-safe mechanism when the gas spring is released.

A load may be associated with the exercise device for providing exercise resistance. A monitor or computer tablet device may be mounted at a suitable location on a part of the exercise device which does not move during exercise, facing the exerciser or user lying supine in the bed, seated or standing so that they can monitor exercise performance such as duration, repetitions, or intensity, or watch entertainment media while exercising. It is also contemplated that the monitor or computer tablet device may include or be coupled with at least one of a gaming system and the exercise device via one or more wireless or wired connections (e.g., wired connection 180) that allows therapists to set and monitor the exercise parameters for the exerciser.

The mobile base of the exercise machine or apparatus allows an exercise device to be moved freely between exercisers or other individuals lying supine in bed while the anchoring system is in an inoperative position, and easily slides partially under a bed until the upright support is adjacent the side of the bed with the exercise device suspended at a selected exercise position over the bed for access by the exerciser. Once in the proper position for use by the exerciser, the base can be locked in place by deployment of the anchoring system with caster wheels raised from the ground, providing a stable platform or base which is capable of handling complex movements and loading associated with exercise machines, resisting rocking or wobbling of the apparatus while an exerciser is performing exercise.

Other features and advantages will become more readily apparent to those of ordinary skill in the art after reviewing the following detailed description and the accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for an exercise machine or apparatus configured for allowing exercisers lying in a supine position in a bed to perform exercises. In one embodiment, the apparatus includes a stable base which has caster wheels for transporting the apparatus to a desired position at a bed and an anchoring system to raise the caster wheels from the ground when the desired position is reached so that stability is maintained and wobbling during exercise performance is reduced or eliminated.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
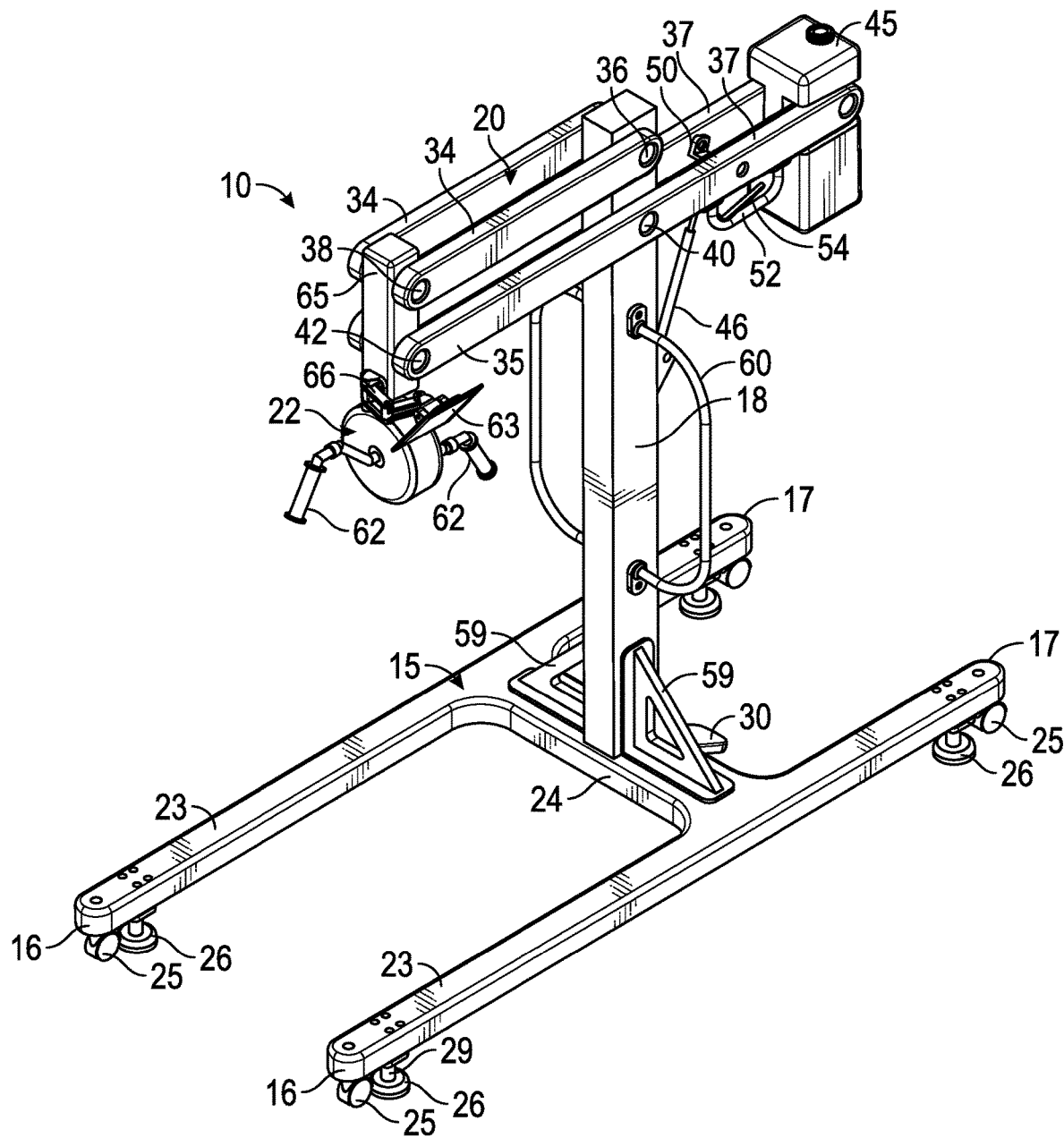
FIG. 1 is a perspective view of one embodiment of an exercise machine configured to allow performance of exercise by a user lying supine in a bed.
Figure 2:
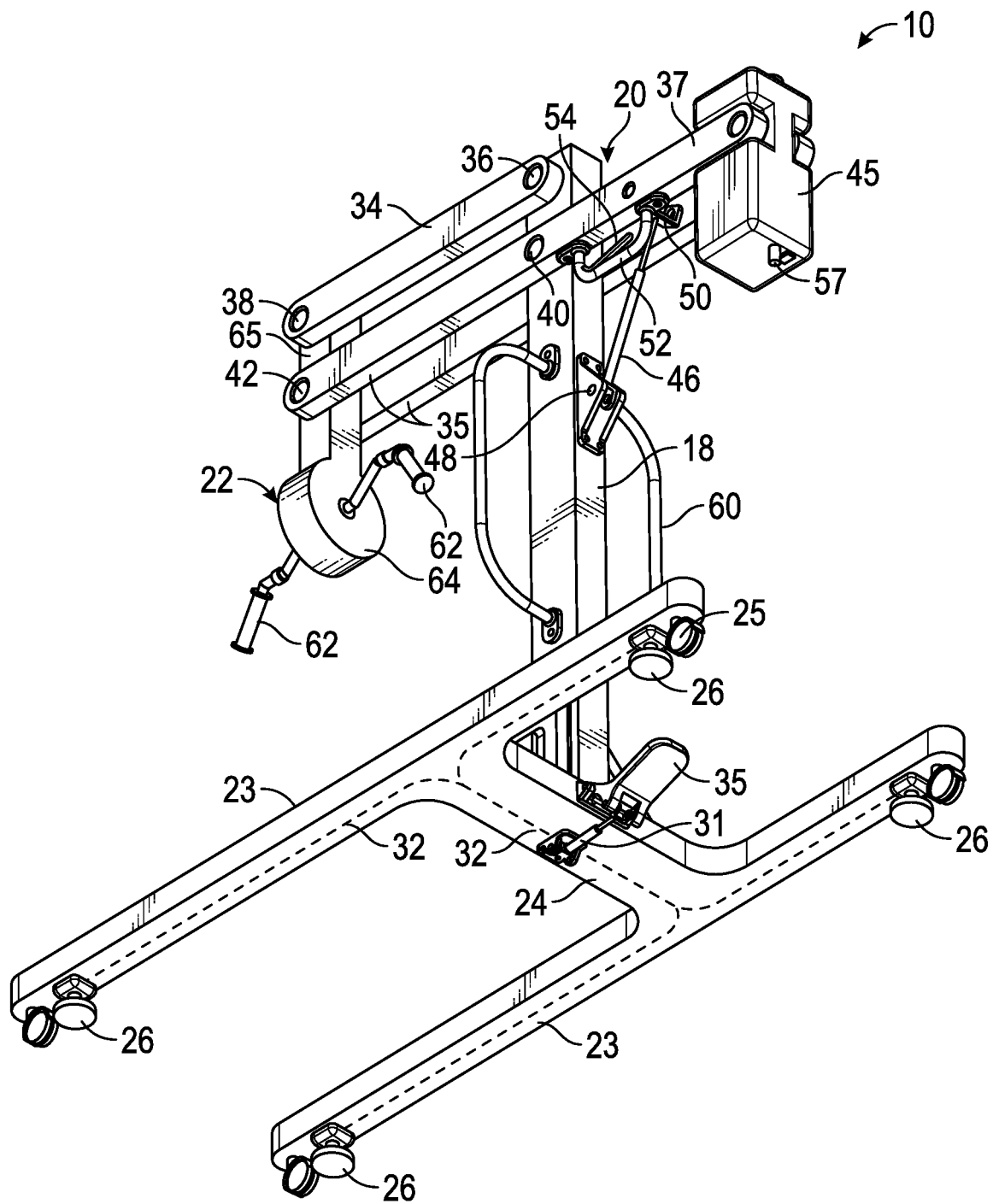
FIG. 2 is a bottom perspective view of the exercise machine of FIG. 1 without the video monitor.
Figure 5:
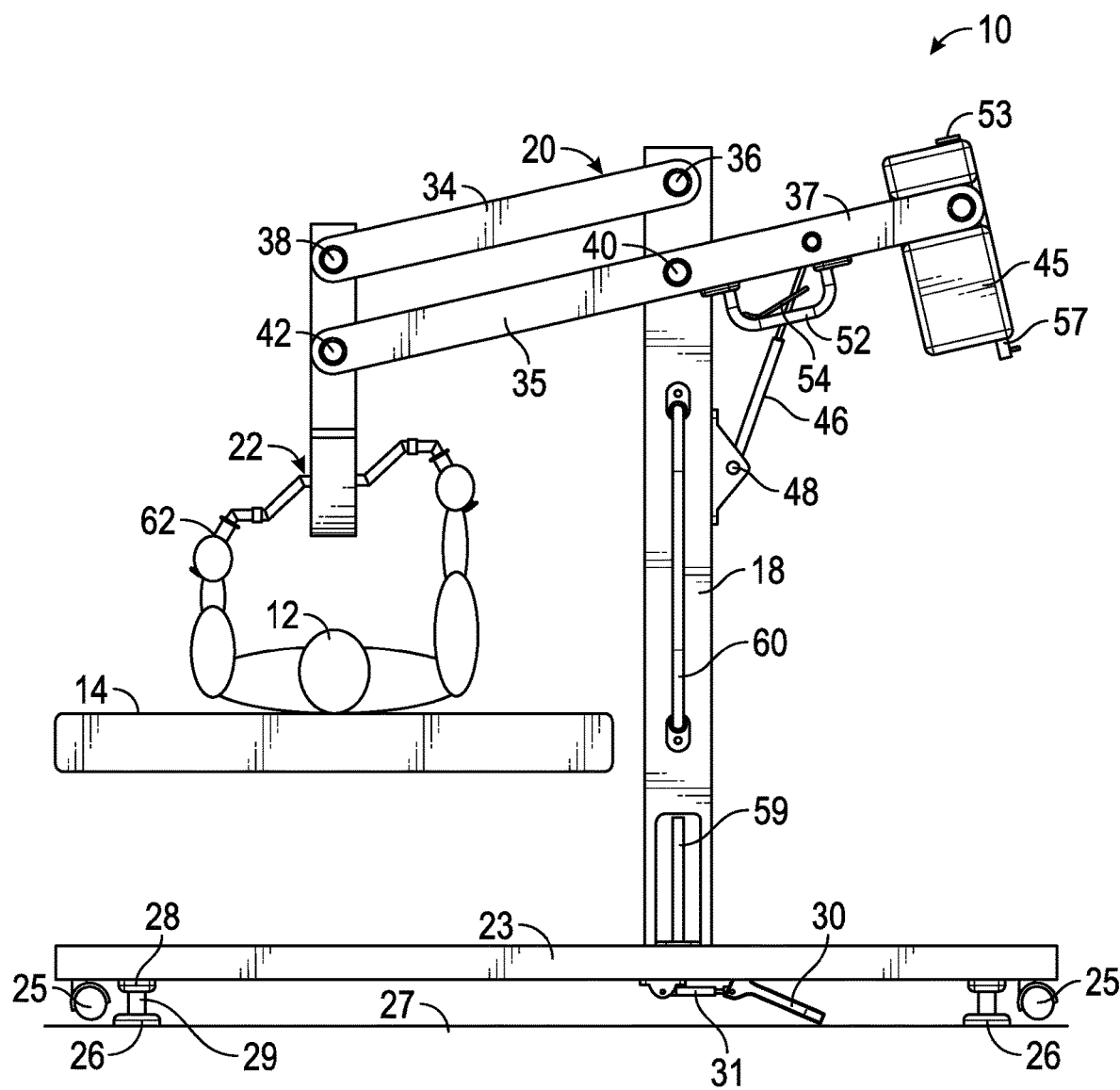
FIG. 5 is a side elevation view similar to FIG. 4 but with the machine in a locked position at an exerciser's bed for performance of exercise in a supine position, and with the exercise device at an adjusted, lower height.

FIGS. 1 to 6 illustrate a first embodiment of an exercise machine 10 which allows performance of exercise by exercisers 12 lying supine in a bed 14, such as a hospital bed, as illustrated schematically in FIG. 5. As best illustrated in FIGS. 1 and 2, the machine basically comprises a mobile support base or base frame 15 having a forward end 16 and a rear end 17, an upright support or column 18 extending upwards from a rear portion of the mobile base, an upper support assembly 20 extending in a generally forward direction from an upper portion of the upright support 18 above the base, and an exercise device 22 suspended from the upper support assembly at a location spaced forward from the upright support. The mobile base 15 is configured for positioning to extend partially under a bed 14 with the upright support 18 located on one side of the bed 14 and the exercise device 22 suspended over the bed in a position accessible by an exerciser in the bed to perform exercise, as illustrated schematically in FIG. 5.

In one embodiment, the mobile base is a generally H-shaped frame with spaced side bars 23 and a cross bar or support 24 extending between the side bars at a location closer to the rear end 17 of the frame, and the upright support 18 extends upward from a central location on cross support 24. The base has a plurality of caster wheels 25 and an anchoring system configured to raise the wheels off the ground or floor to provide a stable base during performance of exercise. In the embodiment of FIGS. 1 to 6, a caster wheel 25 is provided adjacent each end of each of the side bars 23, and the anchoring system comprises plurality of expandable feet or anchors 26 on the mobile base which are movable between a raised, inoperative position (see FIGS. 1-4) and a lowered, ground-engaging or operative position in which the caster wheels 25 are raised from the floor or ground 27 and the feet or foot pads 26 engage the ground (see FIG. 5). Thus, the feet are configured to extend below the caster wheels when fully extended. This arrangement provides a stable base support for the exercise device during performance of exercise. In the illustrated embodiment, a total of four expandable feet or anchors 26 are provided on the base, each anchor 26 spaced a short distance from a respective caster wheel 25, but additional anchors at other locations may be provided in other embodiments. Additionally, the base may be of different design in alternative embodiments. The base support in the anchored condition of FIG. 5 has sufficient structural stability to handle complex movements and loading associated with the use of the exercise device. Other anchoring systems may be used in alternative embodiments. As best illustrated in FIGS. 1 and 2, triangular braces 59 extend from opposite sides of the upright support or column 18 and are rigidly secured to center support 24 of the base, further adding to stability of the support system. Handles 60 on opposite sides of column 18 may be used for transporting the device between hospital beds or from beds to storage when not in use.

Figure 3:
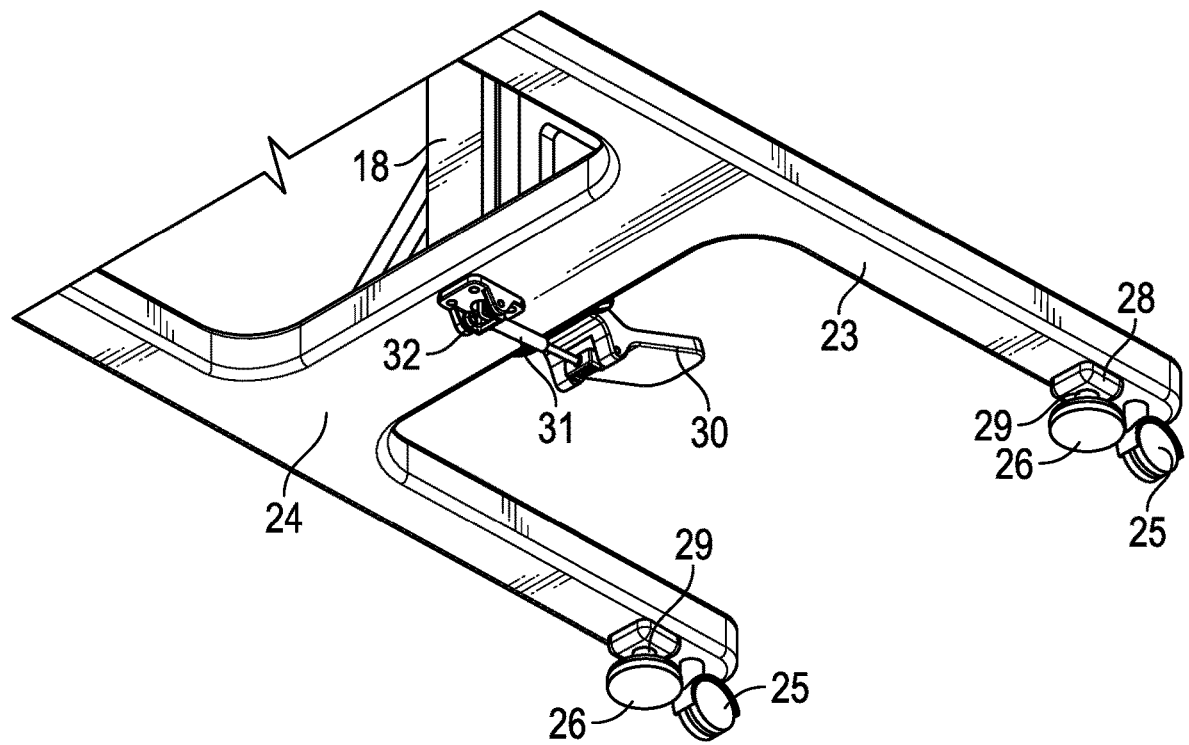
FIG. 3 is an enlarged view of part of the base of the exercise machine of FIG. 2, illustrating the linkage between an actuator pedal and the extendable anchors or foot pads.
Figure 4:
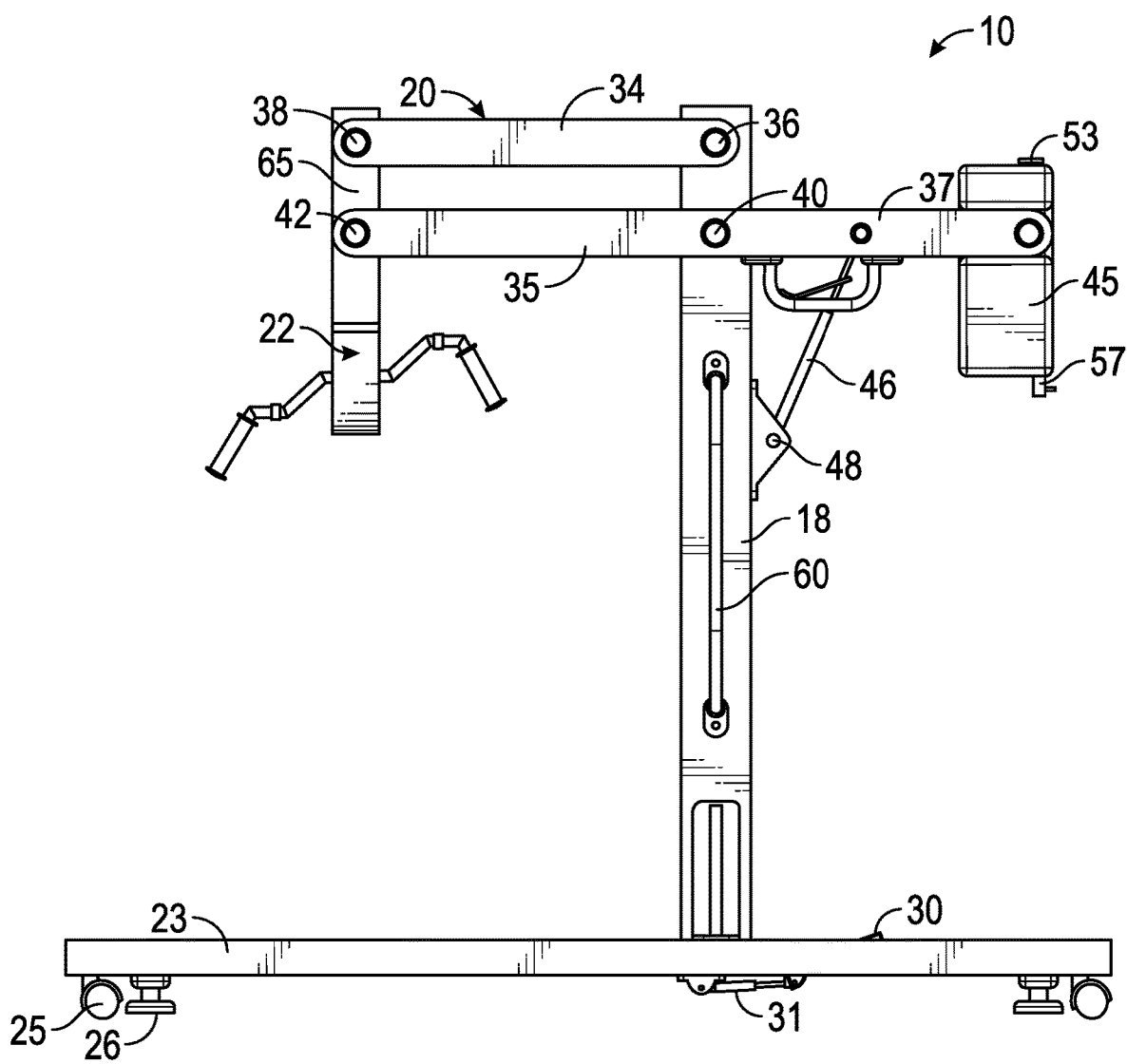
FIG. 4 is a side elevation view of the exercise machine of FIGS. 1 to 3, with the exercise device at a first height.

In the illustrated embodiment, the feet are secured to piston rods 29 extending from hydraulic cylinders 28 to move back and forth between the inoperative and operative positions, as best illustrated in FIG. 3. In this embodiment, foot pedal 30 driving input or supply cylinder 31 is pivotally mounted on the cross bar 24 of the H-shaped frame and extends towards the rear end of the frame, as illustrated in FIGS. 2 to 5. Foot pedal 30 controls actuation of the expanding feet via hydraulic lines 32 extending through the center support 24 and side bars 23 of the frame between the supply cylinder and feet, as illustrated in dotted lines in FIG. 2, but other actuators may be used in alternative embodiments. In the illustrated embodiment, pedal 30 is pushed down to extend the feet or anchors into an operative position (FIG. 5), and the pedal is raised to retract the feet to a raised position when the machine is to be moved to a new location. The pedal may be releasably locked in the lowered position of FIG. 5 when the exercise device is in use or in storage and may be released and spring loaded back to the raised position when the machine is to be moved to a new location. The caster wheels 25 may all be non-locking wheels. Alternatively, some of the wheels may be lockable in some embodiments, such as the rear wheels.

Figure 6:
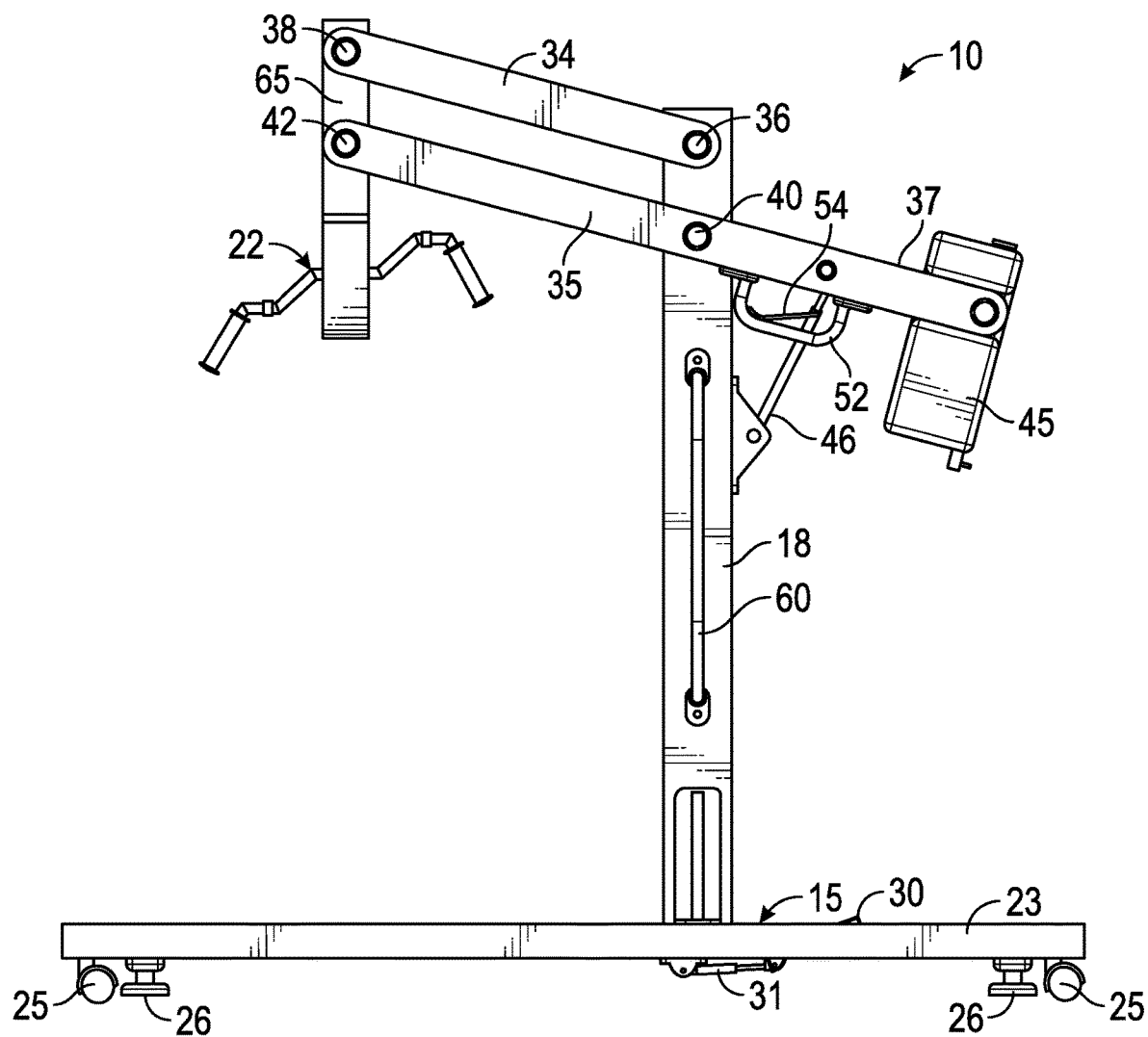
FIG. 6 is a side elevation view similar to FIGS. 4 and 5 but with the exercise device in a raised position.

In this embodiment, the upper support assembly 20 is an adjustment device configured for selective adjustment of the height of the exercise device. In the illustrated embodiment, the adjustment device comprises a four bar pivot linkage, which allows the exercise equipment or device 22 to be raised and lowered over the exerciser for optimum positioning based on the exerciser's arm length or the like, without changing the orientation of the exercise device over the exerciser or reducing stability. FIGS. 1 to 4 illustrate the exercise device 22 at a first height, FIG. 5 illustrates the exercise device 22 in a lowered position over a bed 14, and FIG. 6 illustrates the exercise device in a raised position. As best illustrated in FIGS. 1 and 2, the four bar pivot linkage 20 has upper and lower spaced pairs of parallel links 34, 35. The upper links 34 extend between the upper end portion of support or column 18 and the upper end portion of a support bar or forward support 65 from which exercise device 22 is suspended, and have a first pivot connection 36 to the upright 18 at one end and a second pivot connection 38 to the forward support 65 at the other end. The lower links 35 are longer than the upper links and have rear portions 37 which extend rearward from the upright support or column 18, and are secured to a counterweight 45 at their rear ends. Lower links 35 have a third pivot connection 40 to the upright support 18 spaced below first pivot connection 36, and a fourth pivot connection 42 to the forward support 65 spaced below the second pivot connection 38. The four bar linkage system has pivot joints with tight tolerance and allows the exercise device to be raised and lowered easily in a vertical direction, while resisting rotation and mechanical play. Once locked in position, the structurally stable linkage system helps to maintain the body of the exercise device in a vertical position centered above the exerciser during complex movements and loading associated with performance of the exercise.

In the illustrated embodiment, a user releasable gas spring 46 is pivotally connected between pivot connection 48 on upright column 18 spaced below the four bar pivot linkage and a pivot bracket 50 extending between the rear portions 37 of the lower pivot links 35, as best illustrated in FIG. 2. Gas spring may be extended or retracted to adjust the angle of the four bar pivot linkage and thus the height of the exercise device 22 above the bed 14, and to lock the exercise device in a selected raised position. An alternative drive mechanism for adjusting the angle may be used in other embodiments, such as a drive motor or the like. A handle 52 on the rear portion of one of the lower pivot links 35 incorporates a remote release button or lever 54 for the gas spring 46. Counterweight 45 urges the pivot linkage and the attached exercise device to move upward and away from the exerciser for safety when released, as illustrated in FIG. 6. Any counterweight may be used, but in the illustrated embodiment counterweight 45 is a reservoir or tank which may be filled to a desired level through an upper supply inlet after removing stopper or cap 53, and the amount of fill or the weight may be adjusted by opening drain 57 on the lower wall of counterweight 45. This allows adjustment of the tank weight and therefore the balance of the four bar pivot linkage, which may be helpful when lighter or heavier exercise equipment is to be used, for example if the exercise equipment is interchangeable with other lighter or heavier pieces of equipment, or when other elements such as monitors, game systems, controllers, or different handles affect the mass suspended from the forward end of the four bar linkage. In another embodiment, the counterweight can be designed on a sliding mechanism along the rear portions 37 of the lower links 35, creating a shorter or longer movement arm of the weight from the pivot connection 40.

Figure 1A:
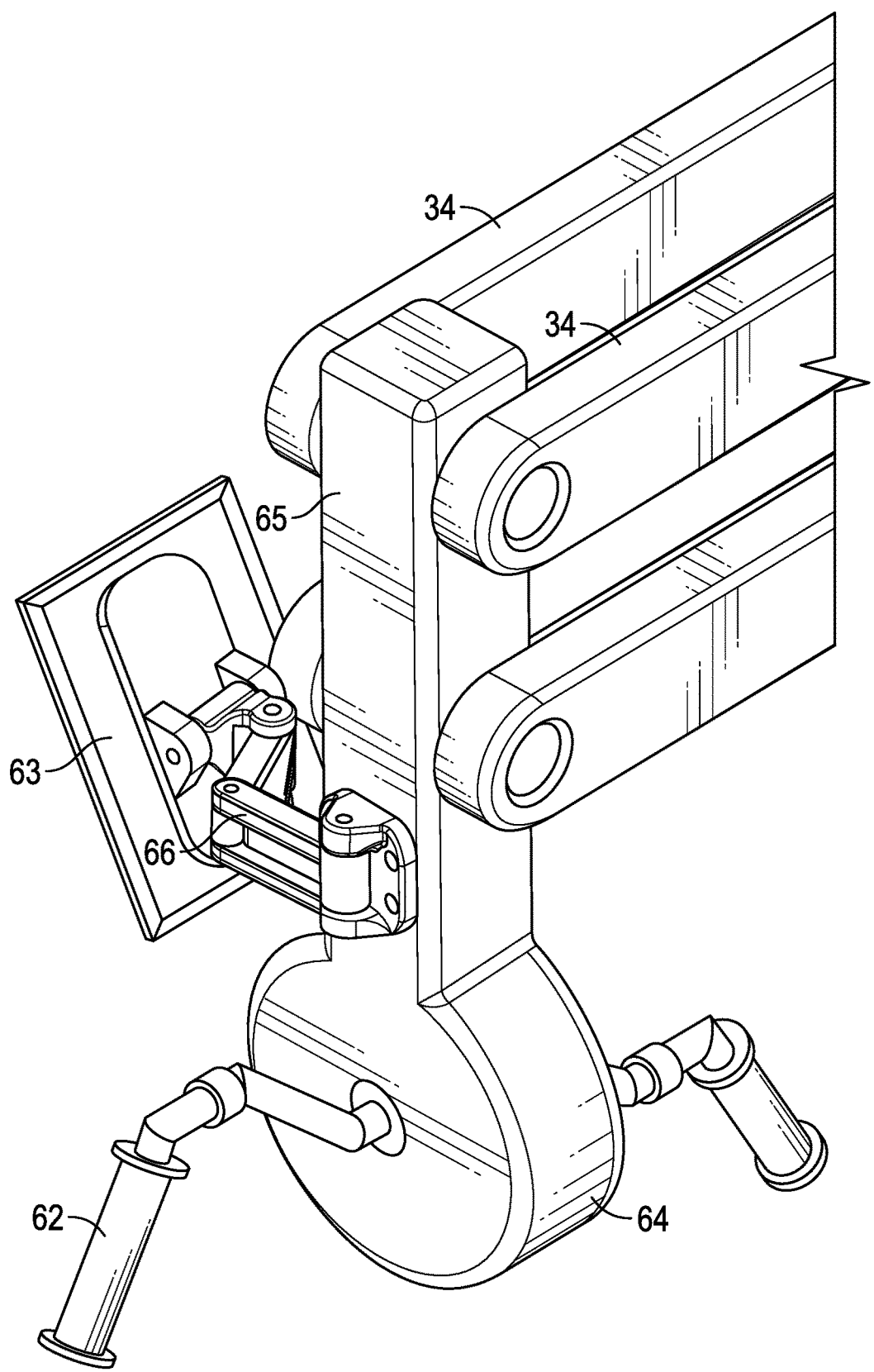
FIG. 1A is a perspective view of the exercise device and support of FIG. 1 with the video monitor facing in the opposite direction to allow viewing when the exercise machine is positioned on the opposite side of the bed.

In the illustrated embodiment, exercise device 22 is an arm cycle ergometer with handles 62 for gripping by a user 12 while performing exercise, as illustrated in FIG. 5. The handles may be fixed or may be adjustable via a crank mechanism for varying crank offset and width and handle angle. In one embodiment, display device or video monitor 63 such as a tablet computer may be mounted on support bar 65 or central hub 64 of the exercise device via articulated arm 66, as illustrated in FIG. 1, and is positioned to face a user in a bed when the machine is in the operative position relative to the bed. The articulated mounting arm 66 allows the monitor to be placed facing the exerciser on either side of support bar 65, as illustrated in FIG. 1 and FIG. 1A. This allows the exercise machine to be positioned from either side of the bed with the exercise device over the exerciser. This is an important option because many hospital beds are accessible from only one side, for example beds located adjacent a wall. The articulated arm mount of the video monitor or tablet computer allows the exercise machine to be placed on either side of the bed without impacting the user experience. Tablet computer or monitor 63 may be used to monitor exercise performance such as duration, repetitions, or intensity, or may be linked to entertainment media for watching by the user while exercising. Controls for the display may be conveniently mounted on or near handles 62. In one example, a rotary encoder for measuring cycling speed has an output linked to monitor 63. A pressure sensor or the like may be linked to monitor 63 in one embodiment to measure cycling torque or resistance. In some contemplated embodiments, use of the exercise device could be used to power the exercise system or tablet 63. For example, it is contemplated that use of the device could cause a video or sound to play (e.g., a movie, television show, song, music video). When the user takes too many breaks or too long of a break, a battery may drain and the entertainment may be interrupted until they resume the exercise.

Any type of adjustable exercise resistance or load may be provided for applying a load when exercise is performed, such as a compact hydraulic resistance system (not illustrated) which may be located in housing 64 of exercise device 22 and linked through hydraulic lines extending through pivot links 34, 35 and column 18 to a supply tank in the base of the device. Other alternative resistance mechanisms include flywheels or other types of resistance such as pneumatic, electromagnetic, elastic bands, flex rods, weight plates, or a selectorized weight stack in column 18.

In this embodiment, the exercise machine 10 can be easily moved from one location to another via mobile base 15 with the anchors or feet 26 in the raised position and the caster wheels 25 contacting the ground 27, as illustrated in FIGS. 1 to 3, and the operator may stand between the rear end portions of base side bars 23 while gripping handles 60 to push the machine. The forward end of the base is then pushed under a bed 14 as illustrated in FIG. 5, with the exercise device 22 suspended above the bed and upright post or column 18 adjacent one side of the bed. Once the machine is properly positioned with the exercise device 22 above an exerciser in the bed, pedal 30 is engaged to deploy anchors or feet 26, raising the caster wheels from the ground as seen in FIG. 5. The height of exercise device 22 is then adjusted using gas spring 46 until it is at a comfortable height for access by the exerciser 12. The base with multiple ground engaging feet provides a stable platform which is capable of handling complex movements and loading associated with performance of exercise on an arm ergometer or the like, avoiding or reducing shaking or unstable movements of the device during exercise. This provides a stable base for pedaling at all intensity levels. Simple locking casters only work for low impact pedaling and provide insufficient stability for more intense exercise. The base is designed to be the heaviest component of the system and provides a low center of mass for the system for increased stability. The upright support or column 18 is rigidly secured to the base with added support from triangular braces 59, further resisting any shaking or unstable movement of the exercise device regardless of intensity of use. By providing a display or tablet computer 63 which is visible in the supine position, the user has immediate feedback on exercise performance which may provide motivation and interest to continue exercise for longer time periods.

The four bar pivot linkage provides for easy and smooth adjustment to raise and lower the exercise device over a bed while maintaining the same orientation relative to the user, until a desired exercise height is reached. The exercise device is integrated with the structural components of the device (base, tower, and overhead support) for added stability and strength, rather than being a separate device which is releasably attached to a support as was common in the past. The four bar pivot linkage itself could also be used as part of the exercise program. For example, a physical stop may be added to limit the downward rotation of the pivot linkage in the direction of the user, thus protecting the user, and the counterweight can be adjusted so that the four bar pivot linkage system provides a bench press exercise system that the user pushes away from their body.

Figure 7:
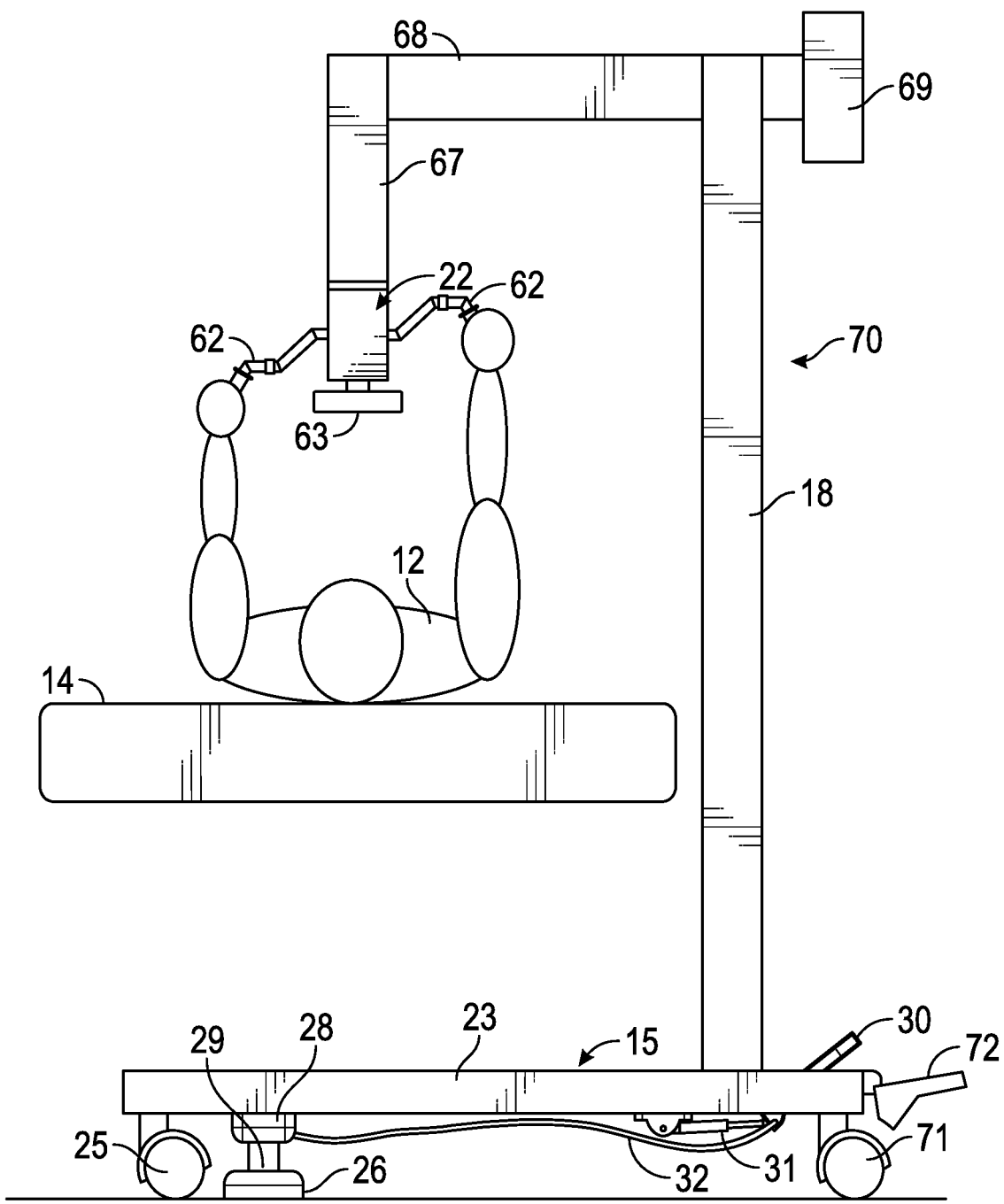
FIG. 7 is a schematic side elevation view of a simplified embodiment of the exercise machine.

Although a height adjustable exercise device is illustrated in FIGS. 1 to 6, the exercise device may be at a fixed height in a simpler alternative embodiment, as illustrated FIG. 7. Some parts of the exercise machine 70 of FIG. 7 are identical to those of the previous embodiment, and like reference numbers are used for like parts as appropriate. In this embodiment, the exercise machine 70 has an exercise device 22 similar to that of FIGS. 1 to 6, but the exercise device is suspended from a vertical support post 67 extending downward from a forward end of a fixed overhead support 68 which is permanently secured at a fixed height on upright column or tower 18. One example of a resistance mechanism or flywheel 69 is illustrated schematically in FIG. 7. In this embodiment, anchors or extendable feet 26 are provided only in the forward portion of the mobile base, and rear caster wheels 71 are associated with caster wheel locks or brakes 72.

Figure 8:
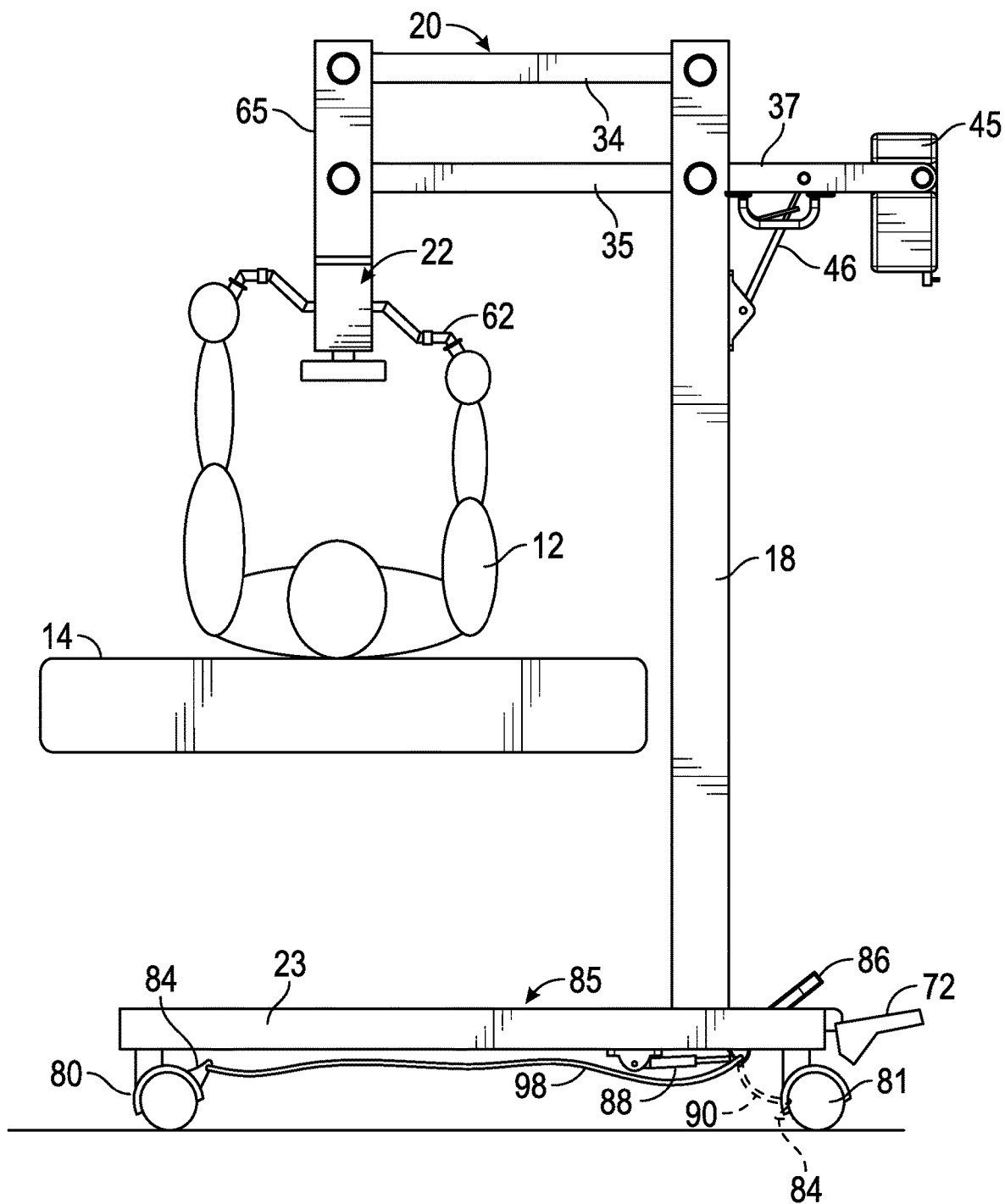
FIG. 8 is a schematic side elevation view of another embodiment of the exercise machine with a modified mobile base.

FIG. 8 illustrates a modified embodiment of the exercise machine of FIGS. 1 to 6 in which the anchoring system for the mobile base is modified. This embodiment is otherwise identical to the embodiments of FIGS. 1 to 6 and like reference numbers are used for like parts as appropriate. The mobile base 85 in this embodiment is identical to that of the first embodiment, except that the extendable feet are eliminated and the front and rear caster wheels 80, 81 are all lockable. At least the front caster wheels 80 have locks or brakes 84 which are remotely lockable, for example via a foot pedal 86 actuating hydraulic cylinder 88 linked to the brakes or locking devices 84 via lines 90, similar to the actuating mechanism for the extendable feet of the first embodiment. This allows the wheels to be locked conveniently from an accessible rear portion of the machine when the front caster wheels are under the bed. The rear wheels 81 may be lockable individually via conventional caster wheel brakes 72, as in FIG. 7. Alternatively, all four wheels may be lockable remotely as indicated in dotted outline in FIG. 8.

Figure 11A:
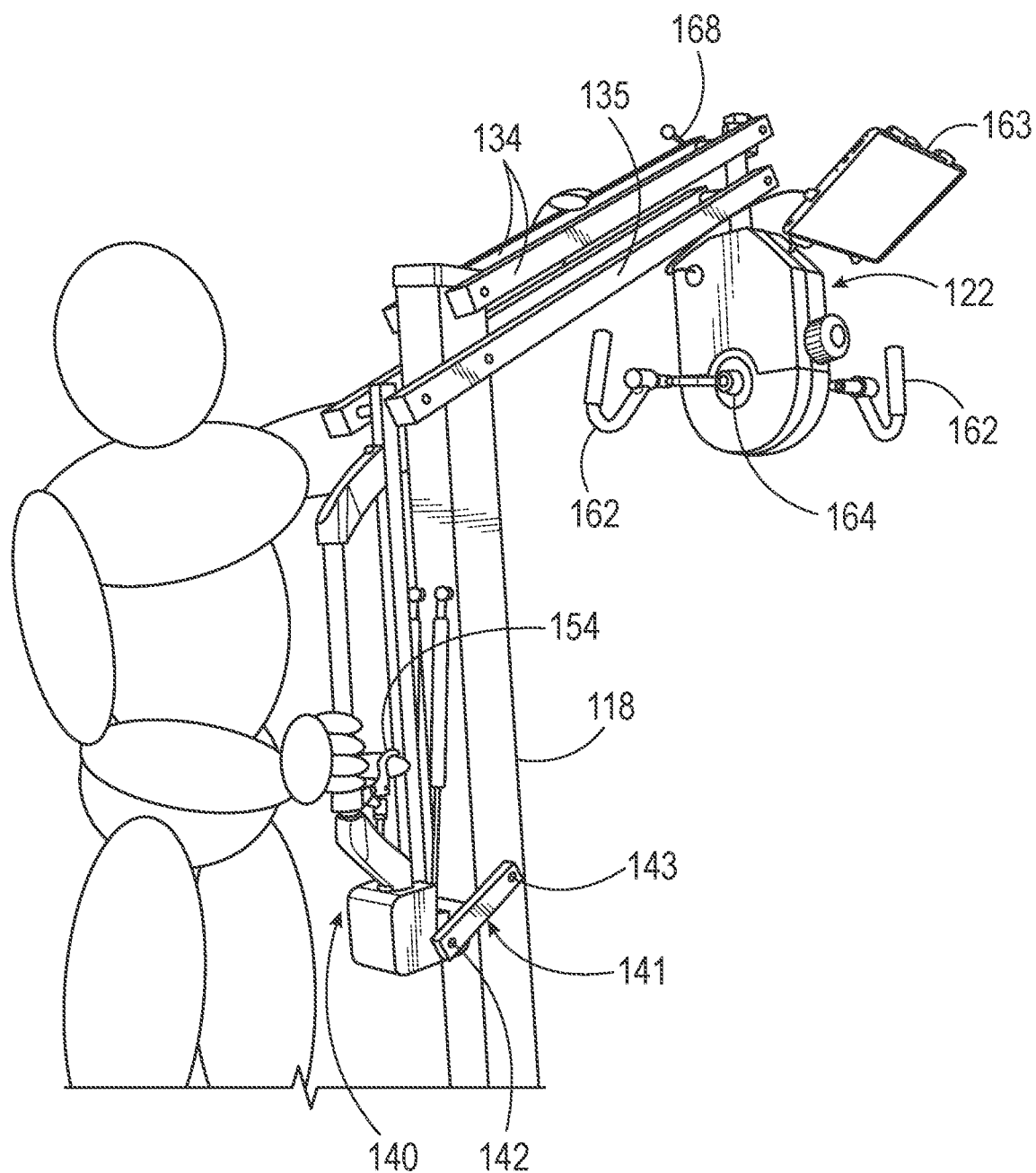
FIGS. 11A-11B are enlarged views of the counterbalancing gas spring mechanism, upper support assembly and exercise device of the exercise machine of FIG. 9 illustrating exercise device in different vertical positions.
Figure 11B:
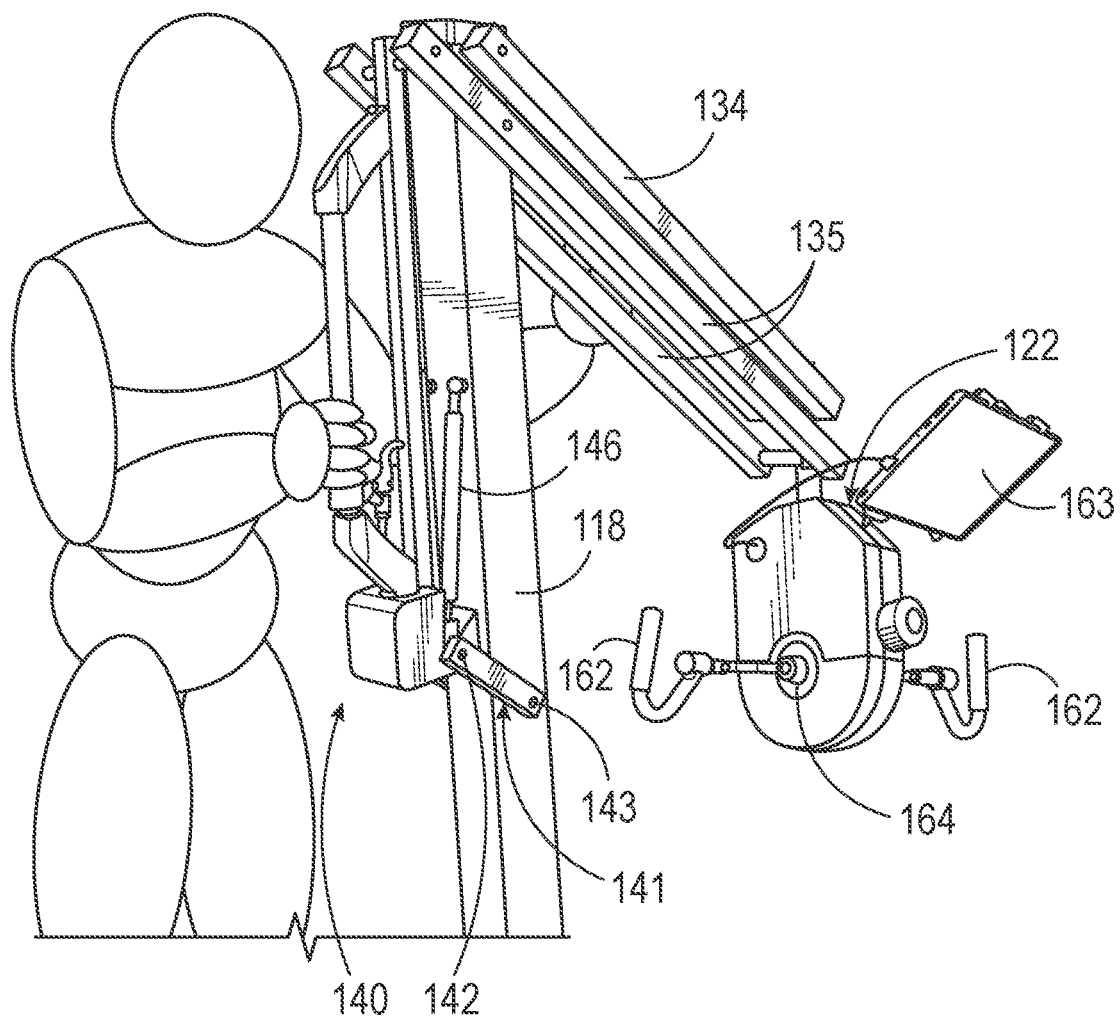
Figure 12A:
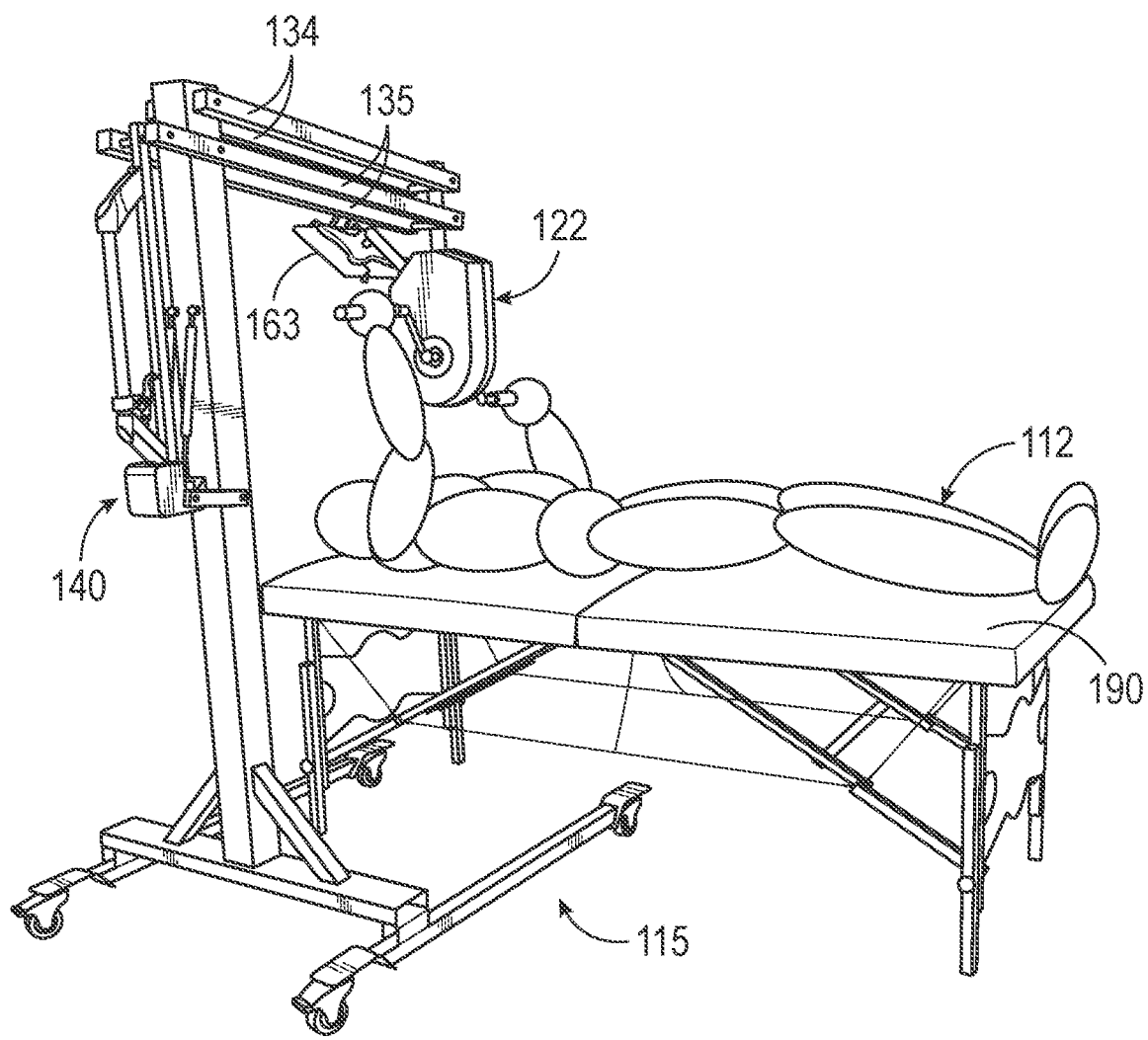
FIGS. 12A-12B illustrate the exercise machine of FIG. 9 being used by an exerciser in a supine position.
Figure 12B:
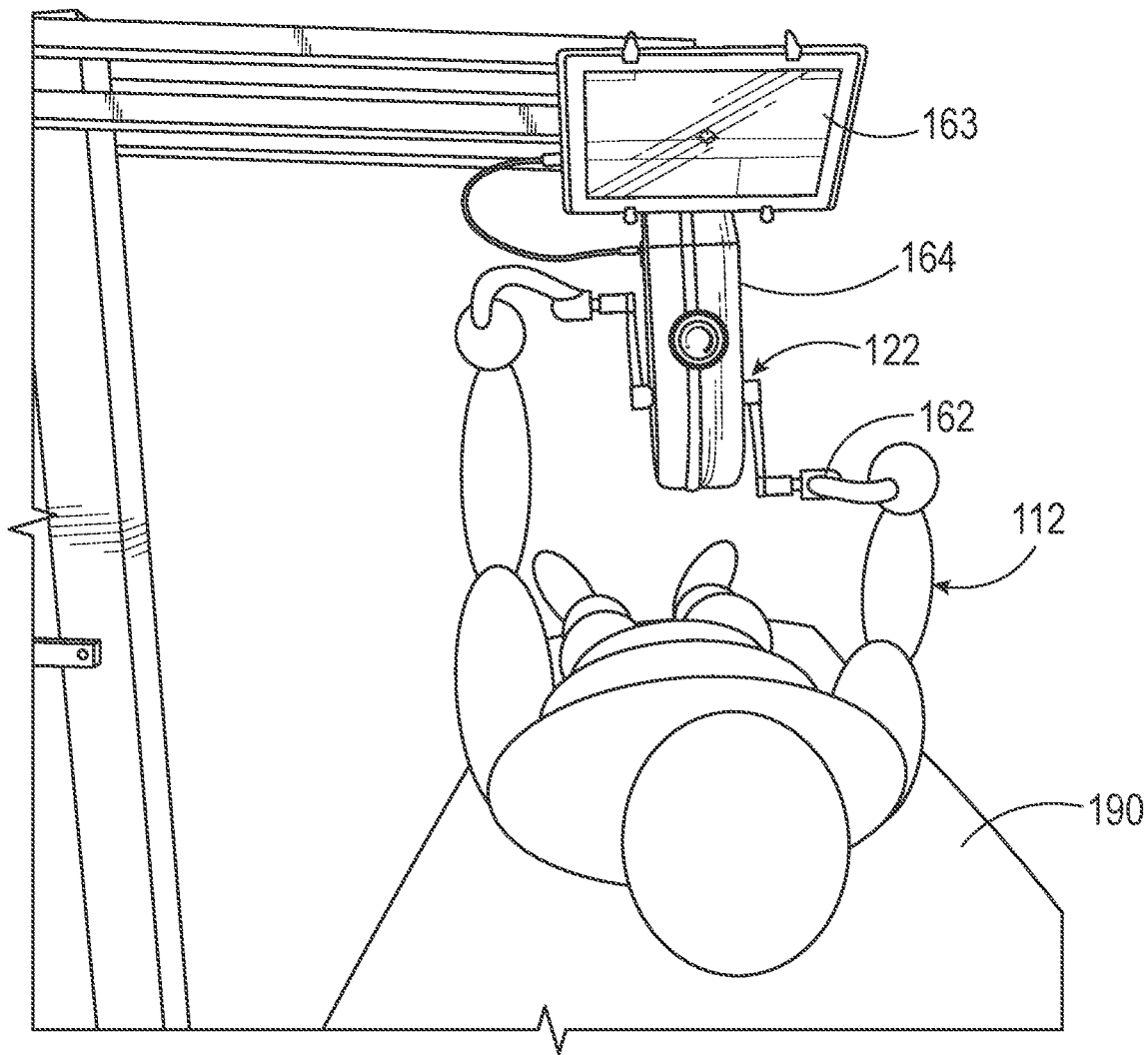
Figure 13A:
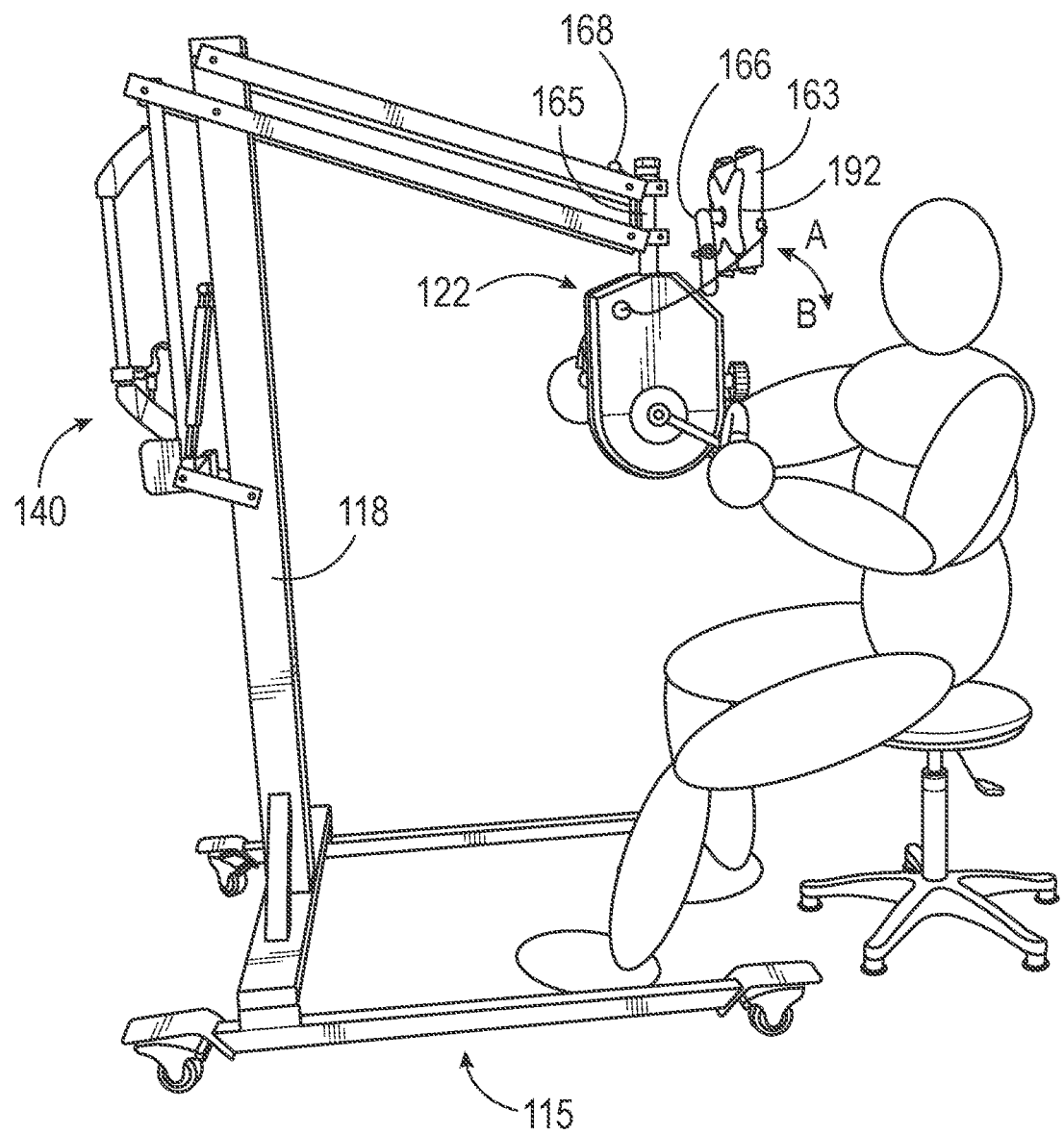
FIGS. 13A-13B illustrate the exercise machine of FIG. 9 being used by an exerciser in a seated position.
Figure 13B:
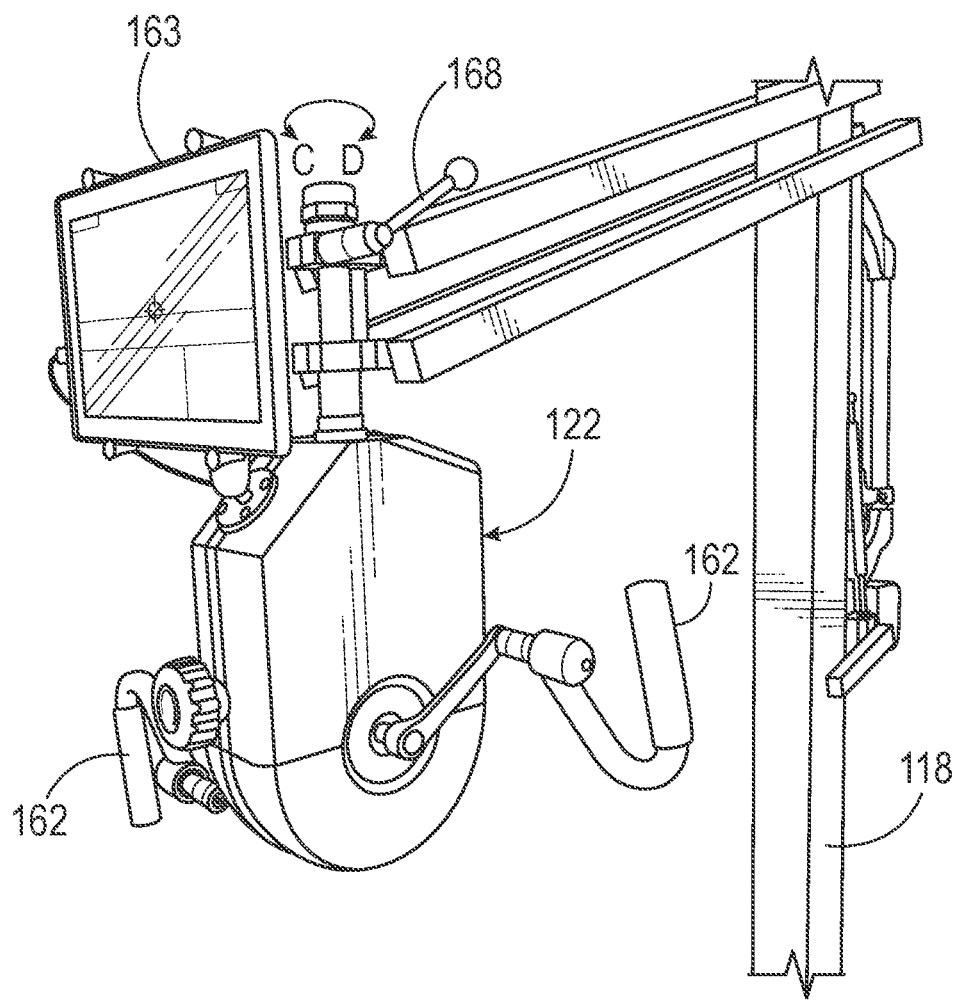
Figure 13C:
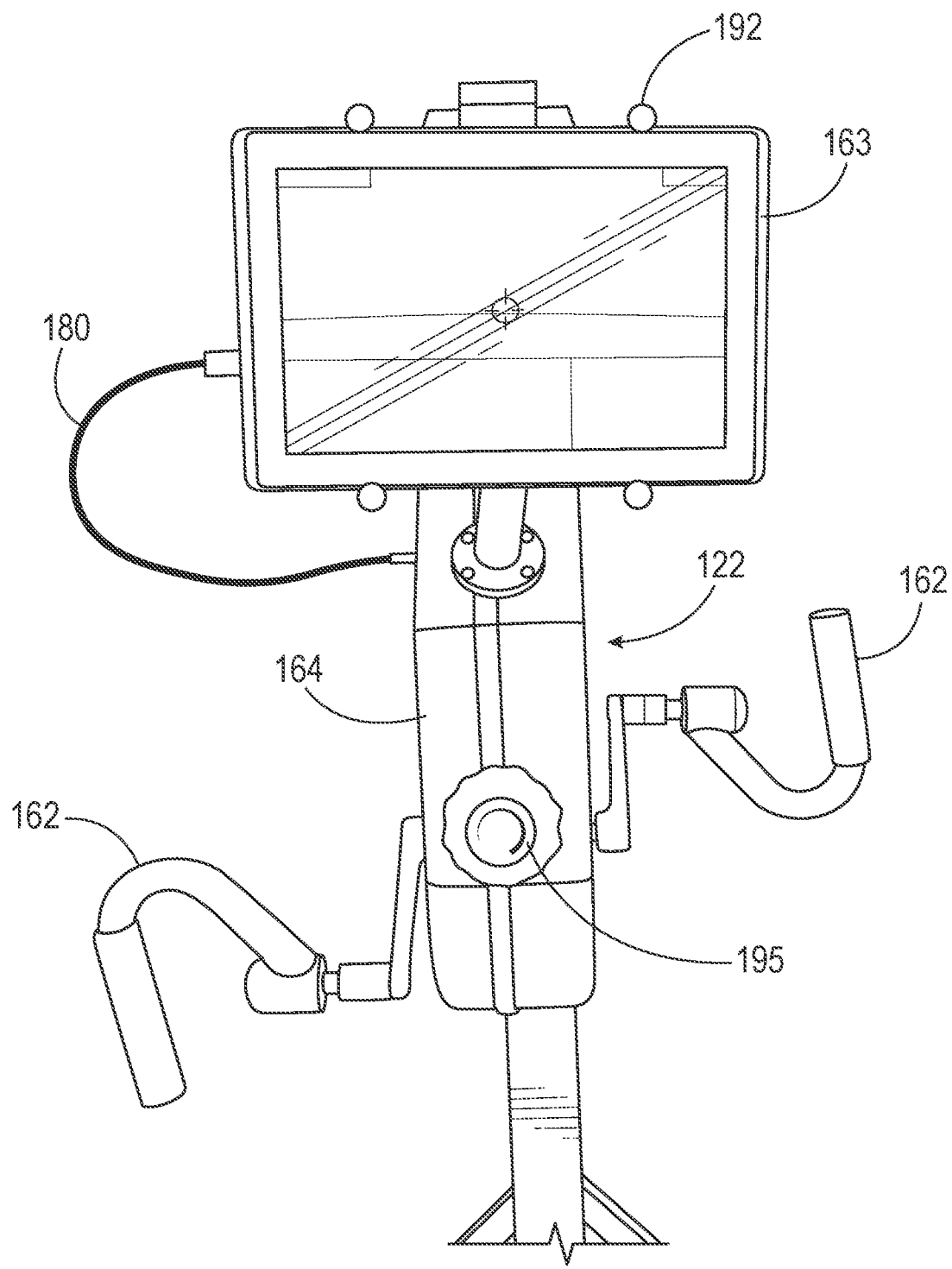
FIG. 13C is an enlarged frontal view of the exercise device and monitor of FIGS. 13A-13B.
Figure 14:
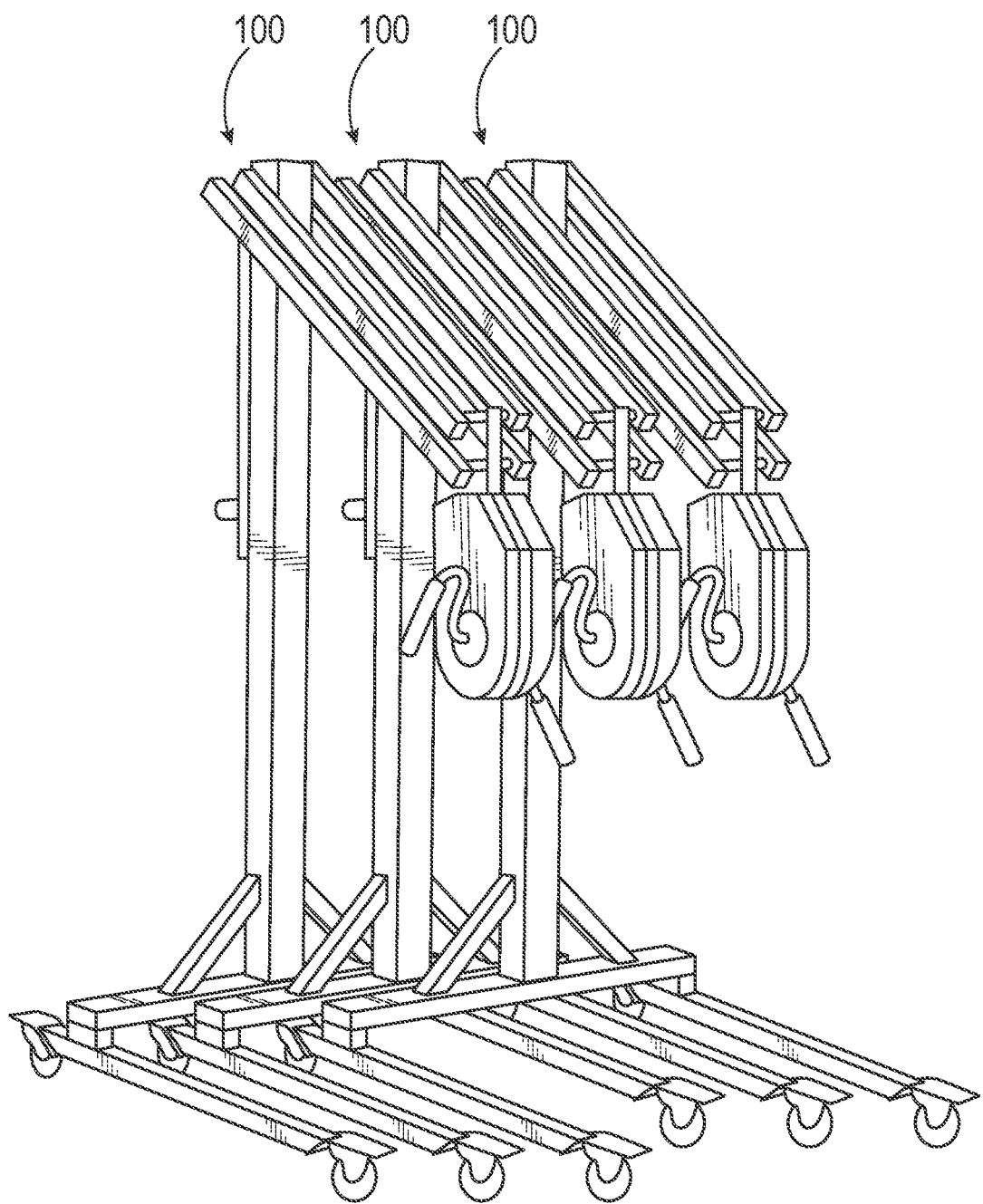
FIG. 14 is a perspective view showing exercise machines nested with identical exercise machines.
Figure 15A:
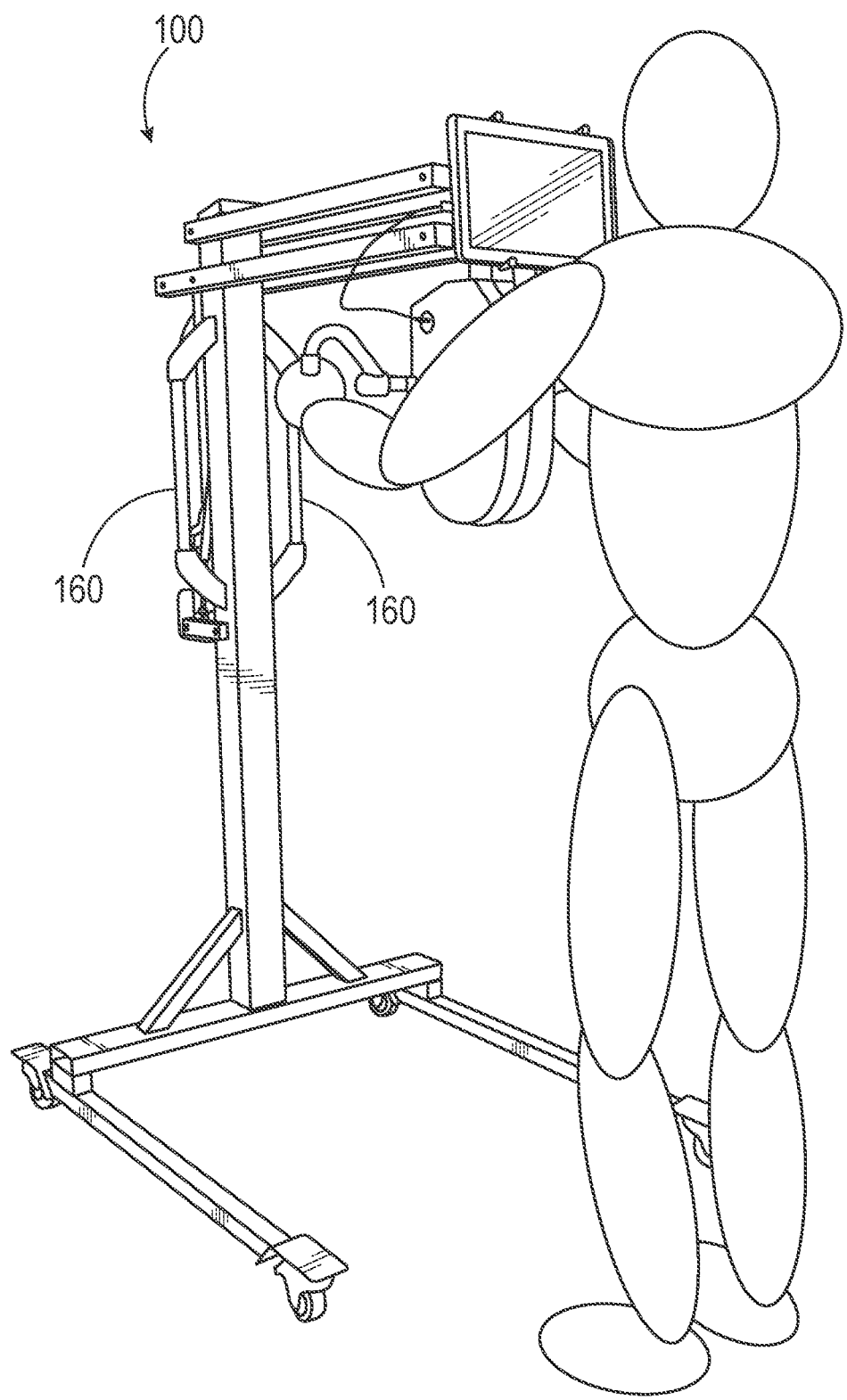
FIGS. 15A-15B illustrates the exercise machine of FIG. 9 with two additional handles and being used by an exerciser in a standing position.
Figure 15B:
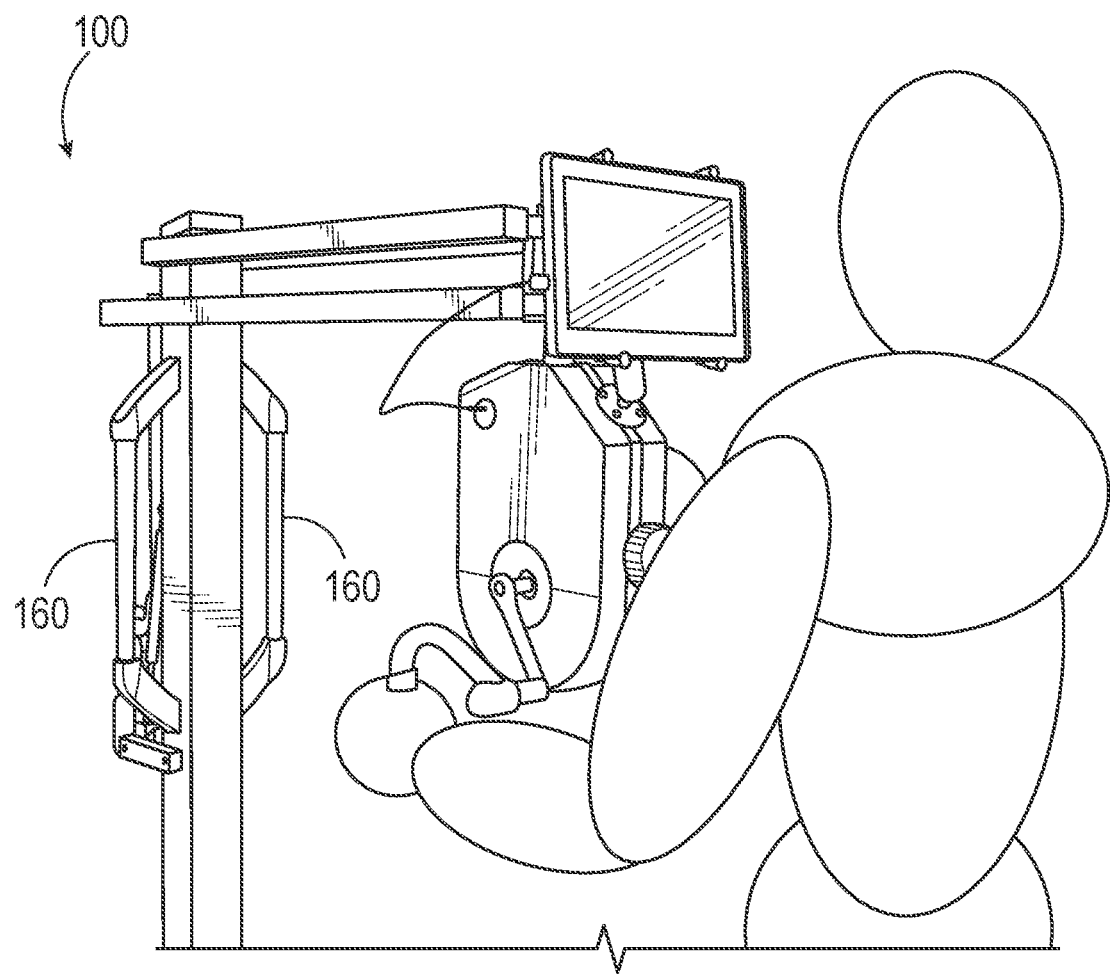

FIGS. 9-15B illustrate yet further embodiments of an exercise machine 100 which allows for performance of exercise by exercisers 112 lying supine in a bed 190 as shown in FIGS. 12A-12B, sitting in a chair as shown in FIG. 13A, or even standing as shown in FIGS. 15A-15B. Exercise machine 100 may include some or all of the features of exercise machine 10, and may advantageously include a compact counterbalancing gas spring mechanism 140. Exercise machine 100 may further allow for a rotation or pivoting of an exercise device 122 around a vertical axis, and a rotation or pivoting of a computing device or monitor 163 around a horizontal axis to allow for an even wider range of uses.

Figure 9:
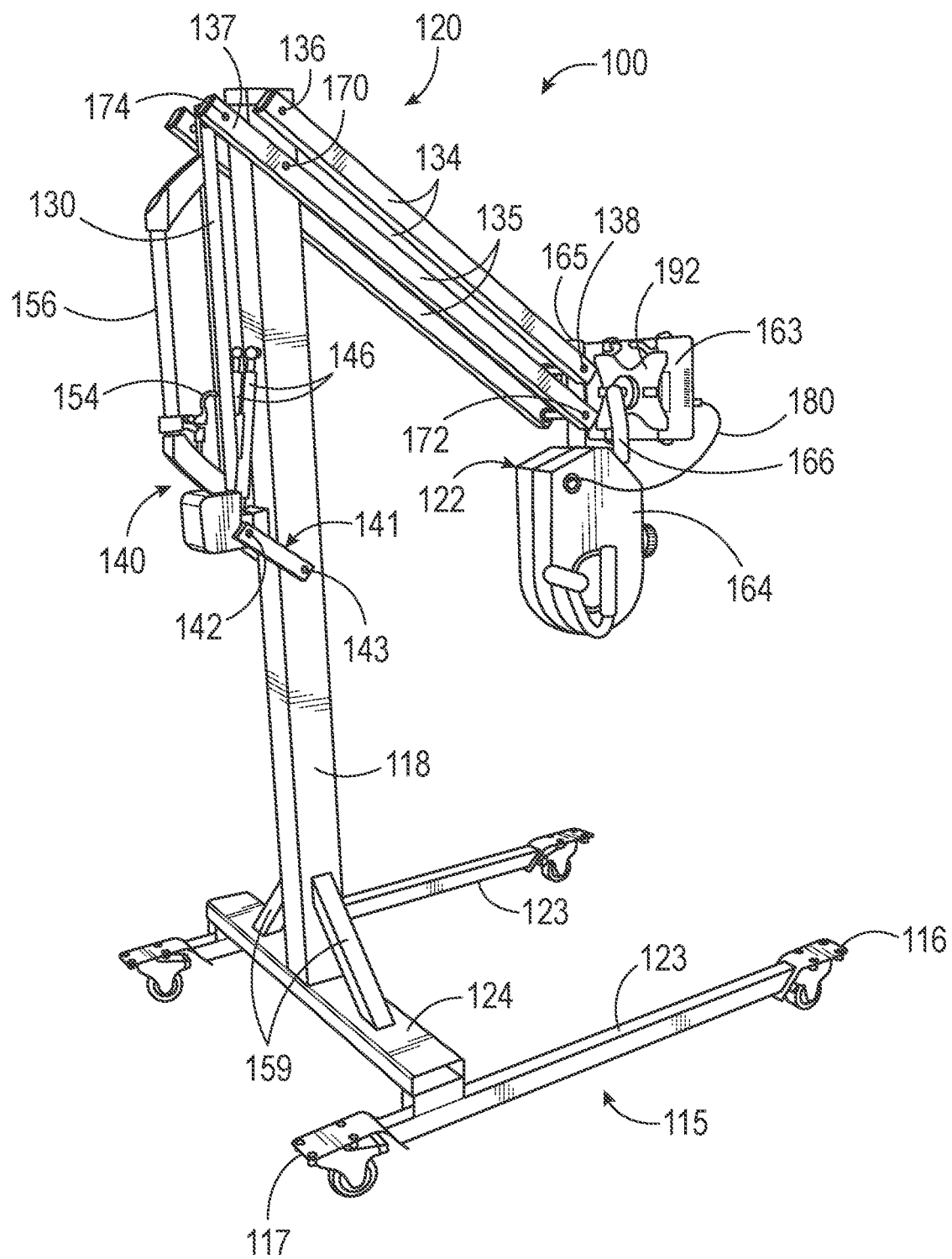
FIG. 9 is a perspective view of an embodiment of an exercise machine configured to allow performance of exercise by a user lying supine in a bed, sitting in a chair or wheelchair, or standing.
Figure 10:
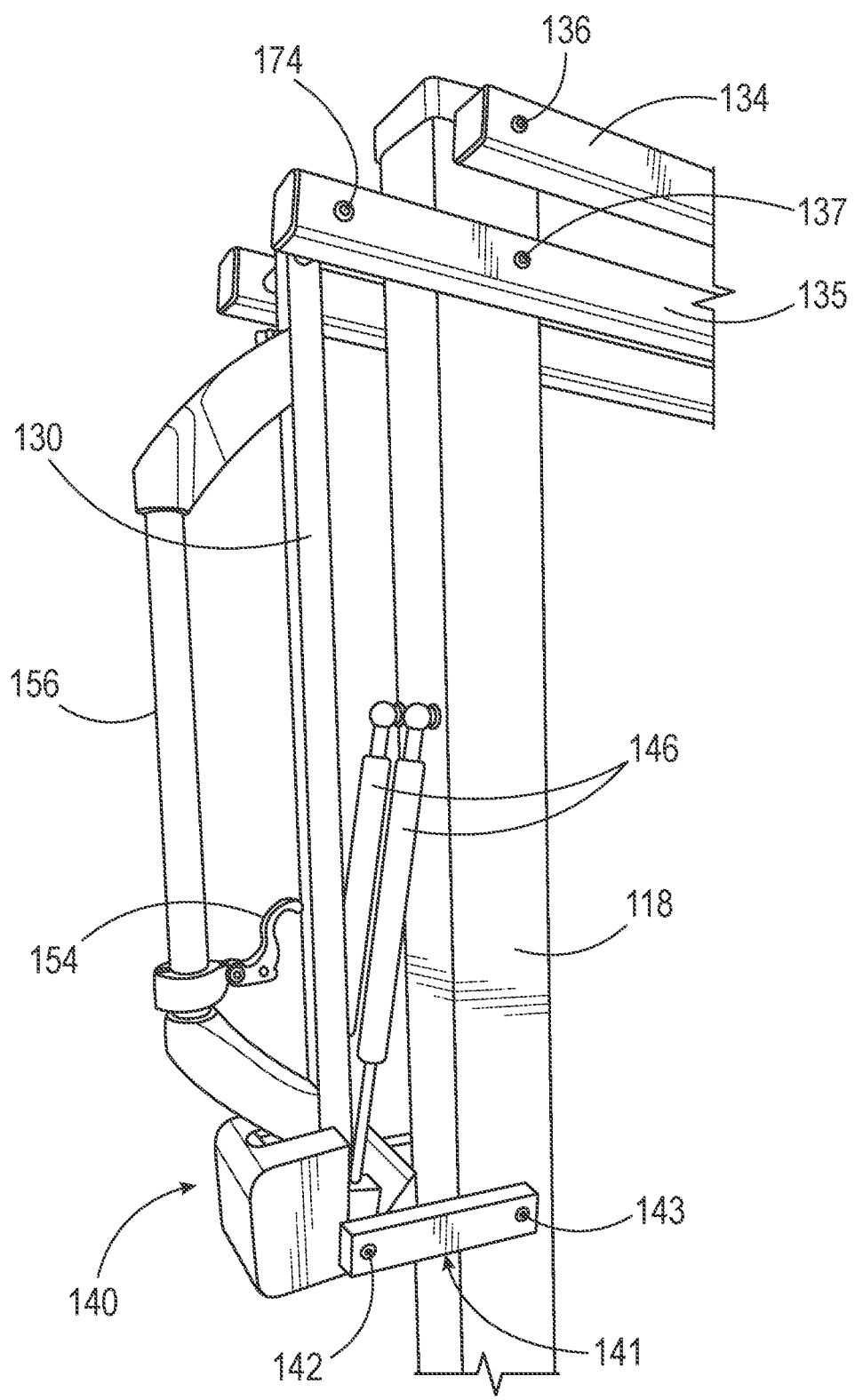
FIG. 10 is an enlarged view of a counterbalancing gas spring mechanism of the exercise machine of FIG. 9.

As best illustrated in FIG. 9, the machine comprises a mobile support base or base frame 115 having a forward end 116 and a rear end 117, an upright support or column 118 extending upwards from a rear portion of the mobile base, an upper support assembly 120 extending in a generally forward direction from an upper portion of the upright support 118 above the base, and an exercise device 122 suspended from the upper support assembly at a location spaced forward from the upright support. The mobile base 115 is similar to mobile base 15 of exercise machine 10, and is configured for positioning to extend partially under a bed with the upright support 118 located on one side of the bed and the exercise device 122 suspended over the bed in a position accessible by an exerciser in the bed to perform exercise, as illustrated schematically in FIGS. 12A-12B.

The mobile base 115 is a generally H-shaped frame with spaced side bars 123 and a cross bar or support 124 extending between the side bars at a location near the rear end 117 of the frame, and the upright support or column 118 extends upward from a central location on cross support 124. In some contemplated embodiments, the cross bar 124 is positioned within 30%, more preferably within 25% or within 20% of the rear end (50% of the rear end being the midpoint between the front end and the rear end). Similarly to the exercise machine shown in FIGS. 1-6, it is contemplated that the base 115 may include a plurality of caster wheels and an anchoring system configured to raise the wheels off the ground or floor to provide a stable base during performance of exercise. Base 115 may also include piston rods and hydraulic cylinders as shown in FIG. 3, and a foot pedal and pedal driving input or supply cylinder as illustrated in FIGS. 2-5. Additionally, exercise machine 100 may include triangular braces 159 that extend from opposite sides of the upright support or column 118 and are rigidly secured to or integral with center support 124 of the base, further adding to stability of the support system. Exercise machine 100 may also include one or more handles (e.g., handle 156, or handles 60 as shown in FIGS. 1-6) for use in transporting the device between hospital beds or from beds to storage when not in use. Furthermore, when release lever 154 is depressed, handle 156 may be used alone or in conjunction with a guiding hand on upper support assembly 120 to position the exercise device at the appropriate height for the exerciser (FIG. 11A-B). During transportation from one exerciser's room to another (or storage) two additional handles (160 on the left and right sides of the support column 118, shown in FIG. 15B) may be used to maintain control of the orientation and speed.

The upper support assembly 120 is an adjustment device configured for selective adjustment of the height of the exercise device. As illustrated, the adjustment device comprises a four bar pivot linkage, which allows the exercise equipment or device 122 to be raised and lowered over the exerciser for optimum positioning based on the exerciser's arm length, the exerciser's position or the like, optionally without changing the orientation of the exercise device over the exerciser or reducing stability. FIGS. 11A-11B illustrate the exercise device 122 at different heights, as shown by the orientation of adjustment bar 141 and the angle formed between the upper support assembly 120 and column 118. The upper support assembly (or four bar pivot linkage) 120 has upper and lower spaced pairs of parallel links 134, 135. The upper links 134 extend between the upper end portion of support or column 118 and the upper end portion of a support bar or forward support 165 from which exercise device 122 is suspended, and have a first pivot connection 136 to the upright 118 at one end and a second pivot connection 138 to the forward support 165 at the other end. The lower links 135 are longer than the upper links and have rear portions 137 which extend rearward from the upright support or column 118, and are secured to a counterbalance arm 130 of a counterbalance gas spring mechanism 140. Lower links 135 have a third pivot connection 170 to the upright support 118 spaced below first pivot connection 136, and a fourth pivot connection 172 to the forward support 165 spaced below the second pivot connection 138. Lower links 135 further comprise a fifth pivot connection 174 to the counterbalance arm 130 of a counterbalancing gas spring mechanism 140 as further described below.

The counterbalancing gas spring mechanism 140 is associated with the four bar pivot linkage via at least fifth pivot connection 174, and may include one or more gas springs 146 actuated by one or more remote release buttons or levers 154, counterbalance arm 130, adjustment bar 141, and handle 156. Counterbalancing gas spring mechanism 140 is configured to counterbalance the weight of the upper support system 120 and exercise device 122, and may be designed to cause the exercise device to move away from the exerciser when at least one of the exercise device and the gas spring is released, to ensure exerciser safety. Viewed from a different perspective, it is contemplated that a force may be required to push the exercise device 122 down towards a exerciser, while movement away from the exerciser may be caused by actuation of lever 154. As counterbalance arm 130 is coupled with the upper support assembly 120 via fifth pivot connection 174, an end of the upper support assembly that is coupled to the exercise device moves towards or away from the exerciser when counterbalance arm 130 moves up or down based on a retraction or extension of gas springs 146.

Gas springs 146 may be extended or retracted, as shown in FIGS. 11A and 11B respectively, to adjust the angle of the four bar pivot linkage and thus the height of the exercise device 122 relative to the exerciser, and to lock the exercise device in one of several selected raised position. A handle 156 of the counterbalancing gas spring mechanism includes or is coupled with a remote release button or lever 154 for actuating one or more gas springs 146. Upon actuation, gas springs 146 extend, causing adjustment bar 141 to pivot such that first end 142 is moved downward relative to second end 143, as shown in FIG. 11A. When gas springs 146 extend causing adjustment bar 141 to pivot, counterbalance arm 130 is moved down towards the base 115, while the pivot linkage and the attached exercise device reverts or moves upward and away from the exerciser. When exercise device 122 is forcefully moved downward towards a seated or supine exerciser, gas springs 146 retract, and adjustment bar 141 pivots in the opposite direction such that first end 142 is moved upward relative to second end 143, as shown in FIG. 11B.

The counterbalancing gas spring mechanism 140 illustrated advantageously allows for a more compact exercise machine 100 in which the upper support assembly 120 and base frame 115 largely extend forward from column 118. Exercise machines of the inventive subject matter (e.g., exercise machine 100) may be nested within another exercise machine to take up less space when stored as shown in FIG. 14. For example, it is contemplated that a portion of a side bar (e.g., at least 25%, at least 50% of a length of a side bar) of one exercise machine may be positioned between the side bars of a second exercise machine. It is also contemplated that a portion of a side bar of multiple exercise machines (e.g., at least 2, at least 3) exercise machines may be positioned between the side bars of another exercise machine.

As best illustrated in FIGS. 12B and 13B-13C, a display device, video monitor or game system 163 may be coupled to exercise device 122, and may be used to monitor exercise performance such as duration, repetitions, or intensity, or may be linked to entertainment media for watching by the user while exercising. It is contemplated that monitor 163 may be mounted or otherwise coupled to the support bar 165 or central hub 164 via monitor arm 166 including a device holder 192.

The controls for the display can be incorporated within an application on a touch screen of a mobile device, which can be reached by the exerciser or the clinician. In one example, a rotary encoder for measuring cycling speed has an output linked to monitor 163. A pressure sensor or the like may be linked to monitor 163 in one embodiment to measure cycling torque or resistance.

Controls 195 for the resistance of the exercise machine may be conveniently mounted on or near handles 162. Any type of adjustable exercise resistance or load may be provided for applying a load when exercise is performed, such as a compact hydraulic resistance system (not illustrated) which may be located in housing or central hub 164 of exercise device 122 and linked through hydraulic lines extending through pivot links 134, 135 and column 118 to a supply tank in the base of the device. Other alternative resistance mechanisms include flywheels or other types of resistance such as pneumatic, electromagnetic, elastic bands, flex rods, weight plates, or a selectorized weight stack in column 118.

An orientation or position of monitor 163 and exercise device 122 may advantageously be adjusted for use by an exerciser lying supine in a bed as shown in FIGS. 12A-12B, sitting down facing the front end of the base as shown in FIGS. 13A-13B, or standing near the front end or sides of the base as shown in FIGS. 15A-15B. As best shown in FIGS. 11B, 12B, and 13A-13B, exercise device 122 and support bar 165 are coupled to an adjustment and locking mechanism 168, which allows the exercise device to be rotated at least 45 degrees, more preferably at least 90 degrees, at least 130 degrees or at least 180 degrees around the vertical axis in directions C and D, and locked in place. It should be appreciated that such adjustment and locking mechanisms allow exercise machine 100 to be used with the base 115 at an angle with a bed, for example where there is not sufficient space under the bed to receive base 115. Furthermore, monitor arm 166 may be movably coupled with at least one of exercise device 122 and device holder 192, such that monitor 163 may move in directions A and B as shown in FIGS. 12A-13B to face the base of exercise machine 100, a face of an exerciser 112 standing or sitting in front of the base, or anywhere in between.

The exercise machine may include any exercise device or exercise equipment suitable for use by a person on bed rest who is constrained to a supine posture in a bed or who prefers to exercise in this position due to pain or other physical limitations. The exercise may also be suitable for use by an exerciser in a wheelchair or otherwise seated, or a user in a standing position. Hand ergometer devices 22 or 122 with handles 62 or 162 are shown in the illustrated embodiments, but other exercise devices may be provided in alternative embodiments. The exercise device may be an active or passive exercise device and may be configured for performance of arm or leg exercises, depending on the physical disability of the exercisers for whom it is designed, and may be an aerobic exercise device or a weight lifting/strength exercise device. The exercise device may be an arm ergometer, rowing exerciser, press-up exercise device, pull down exercise device, bicep curl, chest press, shoulder press, pec fly, leg extension, leg press, leg ergometer, or the like. The exercise device can be quickly and easily positioned over the bed at the appropriate position for engagement by the user's arms or legs when performing the exercise, with the base providing a stable platform and resisting rocking or shaking of the device during exercise.

The mobile base and upright support may advantageously be designed to be extremely stable when the base is locked in position under a bed with the exercise device positioned over a user, and have sufficient structural stability to handle all or most complex movements and loading associated with exercise devices such as arm ergometers or the like. The machine is easy to move around in a hospital, care facility or the like, can be readily positioned on either side of a bed with the mobile base extending partially under the bed, or can be angled relative to a bed if needed. Once positioned, the extending anchors or foot pads are readily extended simply by pressing the foot pedal or another type of actuator in alternative embodiments, such as a hand lever. In some embodiments, the height of the exercise device above the exerciser is readily adjustable to accommodate users with different arm lengths or other different physical attributes (depending on the type of exercise device). Where height adjustment is via a four bar pivot linkage, the exercise device remains in the same orientation as it is adjusted, and a counterweight at the rear end of the pivot linkage automatically moves the exercise arm away from the exerciser for safety when released.

The exercise machines described herein have advantages over prior exercise devices for use by individuals in a supine position, which were often too unstable so that the exercise device rocked or moved erratically when operated. This reduced motivation for exercise in exercisers constrained in a supine position for extended periods of time. The exercise machines of the above embodiments are easier to move around and more stable when the base is anchored in position, and thus is likely to be used more frequently by exercisers in a supine position, potentially improving recovery times as well as reducing boredom of extended bed rest. Still further, some exercise machines described above may be used throughout the recovery of an exerciser (e.g., a patient), and are suitable for use by an exerciser in a supine, seated, standing or other position.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. An exercise machine for use by an exerciser in a supine, seated or standing position, comprising:
   a mobile base having a forward end and a rear end;
   an upright support extending upwards from the mobile base;
   an upper support assembly extending in a generally forward direction from an upper portion of the upright support;

an exercise device suspended from the upper support assembly at a location spaced from the upright support; and a counterbalancing system configured to urge the exercise device upwards and away from the exerciser;

wherein the upper support assembly comprises a four bar pivot linkage and an actuator configured to control the four bar pivot linkage to adjust the height of the exercise device;

wherein the four bar pivot linkage comprises a forward support from which the exercise device is suspended, at least one upper pivot link having a first pivot connection to the upright support and a second pivot connection to the forward support, and at least one lower pivot link having a third pivot connection to the upright support below the first pivot connection, and a fourth pivot connection to the forward support below the second pivot connection;

wherein one of the pivot links has a rear portion extending rearward from the upright support and having a fifth pivot connection to a counterbalance arm of the counterbalancing system.

2. The exercise machine of claim 1, wherein the exercise device is rotatable about a vertical axis.

3. The exercise machine of claim 2, wherein the exercise device is rotatable at least 45 degrees about the vertical axis.

4. The exercise machine of claim 1, wherein the mobile base comprises an H-shaped frame with a pair of side bars and a cross bar extending between the side bars, and wherein the upright support extends upward from a central portion of the cross bar.

5. The exercise machine of claim 4, wherein the cross bar is located closer to the rear end of the mobile base than the forward end.

6. The exercise machine of claim 1, wherein the base has at least two spaced forward caster wheels adjacent the forward end and at least two spaced rear caster wheels adjacent the rear end, and at least two expandable forward feet each located in the vicinity of a respective forward caster wheel.

7. The exercise device of claim 6, further comprising at least two expandable rear feet each located in the vicinity of a respective rear caster wheel.

8. The exercise machine of claim 1, further comprising a display device coupled to the exercise device, the display device being positionable to face the exerciser in a bed when the exercise device is in the operative position relative to the bed.

9. The exercise machine of claim 8, wherein the display device is positionable to face a seated in a chair exerciser when the exercise device is in the operative position relative to the chair.

10. The exercise machine of claim 1, wherein the actuator comprises a gas spring.

11. The exercise machine of claim 1, wherein the exercise device is selected from the group consisting of an arm ergometer, a rowing exerciser, a press-up exercise device, a pull down exercise device, a bicep curl exercise device, a chest press exercise device, a shoulder press exercise device, a leg extension exercise device, a leg press exercise device, and a leg cycling exercise device.

12. The exercise machine of claim 1, further comprising a load associated with the exercise device for adjusting exercise resistance.

13. The exercise machine of claim 1, wherein the mobile base is sized and dimensioned to be nested with a second mobile base of a second exercise machine.

14. An exercise machine comprising:

a mobile base having a forward end and a rear end;

an upright support extending upwards from the mobile base;

an upper support assembly extending in a generally forward direction from an upper portion of the upright support;

an exercise device suspended from the upper support assembly at a location spaced from the upright support; and a counterbalancing system configured to urge the exercise device upwards and away from an exerciser;

wherein the upper support assembly comprises a four bar pivot linkage and an actuator configured to control the four bar pivot linkage to adjust the height of the exercise device;

wherein the four bar pivot linkage comprises a forward support from which the exercise device is suspended, at least one upper pivot link having a first pivot connection to the upright support and a second pivot connection to the forward support, and at least one lower pivot link having a third pivot connection to the upright support below the first pivot connection, and a fourth pivot connection to the forward support below the second pivot connection;

wherein one of the pivot links has a rear portion extending rearward from the upright support and having a fifth pivot connection to a counterbalance arm of the counterbalancing system.

15. The exercise machine of claim 14, wherein the exercise device is rotatable about a vertical axis.

16. The exercise machine of claim 15, wherein the exercise device is rotatable at least 45 degrees about the vertical axis.

17. The exercise machine of claim 14, wherein the actuator comprises a gas spring.

18. The exercise machine of claim 14, wherein the exercise device is selected from the group consisting of an arm ergometer, a rowing exerciser, a press-up exercise device, a pull down exercise device, a bicep curl exercise device, a chest press exercise device, a shoulder press exercise device, a leg extension exercise device, a leg press exercise device, and a leg cycling exercise device.

19. The exercise machine of claim 14, further comprising a load associated with the exercise device for adjusting exercise resistance.

20. The exercise machine of claim 14, wherein the mobile base comprises an H-shaped frame with a pair of side bars and a cross bar extending between the side bars, and wherein the upright support extends upward from a central portion of the cross bar.

* * * * *